(12) United States Patent
Silver et al.

(10) Patent No.: US 12,075,327 B2
(45) Date of Patent: *Aug. 27, 2024

(54) SYSTEM AND METHOD FOR EXECUTING ORIGINATING SERVICES IN A TERMINATING NETWORK FOR IMS AND NON-IMS APPLICATIONS

(71) Applicant: TANGO NETWORKS, INC., Frisco, TX (US)

(72) Inventors: Andrew Silver, Frisco, TX (US); Lathan Lewis, Dallas, TX (US); Patricia Landgren, Plano, TX (US)

(73) Assignee: TANGO NETWORKS, INC., Frisco, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/884,447

(22) Filed: Aug. 9, 2022

(65) Prior Publication Data
US 2022/0386213 A1    Dec. 1, 2022

Related U.S. Application Data

(63) Continuation of application No. 16/890,886, filed on Jun. 2, 2020, now Pat. No. 11,412,435, which is a
(Continued)

(51) Int. Cl.
*H04L 29/06* (2006.01)
*H04L 12/66* (2006.01)
(Continued)

(52) U.S. Cl.
CPC ............. *H04W 40/02* (2013.01); *H04L 12/66* (2013.01); *H04L 65/00* (2013.01);
(Continued)

(58) Field of Classification Search
CPC ............... H04L 12/66; H04L 29/06176; H04L 65/1016; H04L 65/104; H04L 65/1033;
(Continued)

(56) References Cited

U.S. PATENT DOCUMENTS 4,600,812 A    7/1986 Gerlits
5,375,161 A    12/1994 Fuller et al.
(Continued)

FOREIGN PATENT DOCUMENTS

EP    0926910 A1    6/1999
EP    0926910 B1    5/2001
(Continued)

*Primary Examiner* — Luat Phung

(57) ABSTRACT

A mobile application gateway for connecting devices on a cellular network with individual networks, such as enterprise voice and data networks and/or residential networks. The effects of the present invention are far reaching in terms of transferring effective call control from the cellular network into the control of the individual network such as the enterprise, and enabling new business models for the purchase of cellular service from a public cellular carrier by an enterprise. The invention may consist of a primarily of core network and services components based on the IMS network architecture, and is backward compatible to support legacy systems in place in current telecom and data networks.

20 Claims, 17 Drawing Sheets

Related U.S. Application Data continuation of application No. 14/970,232, filed on Dec. 15, 2015, now Pat. No. 10,674,419, which is a continuation of application No. 11/509,200, filed on Aug. 24, 2006, now Pat. No. 9,215,319.

(60) Provisional application No. 60/797,724, filed on May 4, 2006, provisional application No. 60/778,276, filed on Mar. 2, 2006, provisional application No. 60/778,252, filed on Mar. 2, 2006, provisional application No. 60/778,443, filed on Mar. 2, 2006.

(51) Int. Cl.

| | | |
|---|---|---|
| *H04L 29/08* | (2006.01) | |
| *H04L 65/00* | (2022.01) | |
| *H04L 65/1016* | (2022.01) | |
| *H04L 65/102* | (2022.01) | |
| *H04L 65/1023* | (2022.01) | |
| *H04L 65/1033* | (2022.01) | |
| *H04L 65/1053* | (2022.01) | |
| *H04L 65/1069* | (2022.01) | |
| *H04L 65/1076* | (2022.01) | |
| *H04L 65/1104* | (2022.01) | |
| *H04L 67/10* | (2022.01) | |
| *H04L 67/56* | (2022.01) | |
| *H04M 3/42* | (2006.01) | |
| *H04M 7/00* | (2006.01) | |
| *H04M 15/00* | (2006.01) | |
| *H04Q 3/00* | (2006.01) | |
| *H04Q 3/62* | (2006.01) | |
| *H04Q 3/72* | (2006.01) | |
| *H04W 4/16* | (2009.01) | |
| *H04W 8/26* | (2009.01) | |
| *H04W 28/02* | (2009.01) | |
| *H04W 40/02* | (2009.01) | |
| *H04W 40/22* | (2009.01) | |
| *H04W 40/30* | (2009.01) | |
| *H04W 76/10* | (2018.01) | |
| *H04W 76/12* | (2018.01) | |
| *H04W 88/16* | (2009.01) | |
| *H04W 92/02* | (2009.01) | |
| *H04W 92/06* | (2009.01) | |
| *H04L 65/1106* | (2022.01) | |
| *H04W 4/20* | (2018.01) | |
| *H04W 8/12* | (2009.01) | |
| *H04W 40/00* | (2009.01) | |
| *H04W 76/19* | (2018.01) | |
| *H04W 76/20* | (2018.01) | |
| *H04W 76/22* | (2018.01) | |
| *H04W 76/28* | (2018.01) | |
| *H04W 76/30* | (2018.01) | |
| *H04W 80/00* | (2009.01) | |
| *H04W 84/16* | (2009.01) | |

(52) U.S. Cl.
CPC ........ *H04L 65/1016* (2013.01); *H04L 65/102* (2013.01); *H04L 65/1023* (2013.01); *H04L 65/1033* (2013.01); *H04L 65/104* (2013.01); *H04L 65/1053* (2013.01); *H04L 65/1069* (2013.01); *H04L 65/1076* (2013.01); *H04L 65/1104* (2022.05); *H04L 67/10* (2013.01); *H04L 67/56* (2022.05); *H04M 3/42042* (2013.01); *H04M 3/42068* (2013.01); *H04M 3/42102* (2013.01); *H04M 3/42314* (2013.01); *H04M 7/0075* (2013.01); *H04M 7/009* (2013.01); *H04M 15/00* (2013.01); *H04M 15/57* (2013.01); *H04M 15/63* (2013.01); *H04M 15/8292* (2013.01); *H04Q 3/0025* (2013.01); *H04Q 3/0045* (2013.01); *H04Q 3/62* (2013.01); *H04Q 3/72* (2013.01); *H04W 4/16* (2013.01); *H04W 8/26* (2013.01); *H04W 28/0289* (2013.01); *H04W 40/22* (2013.01); *H04W 40/30* (2013.01); *H04W 76/10* (2018.02); *H04W 76/12* (2018.02); *H04W 88/16* (2013.01); *H04W 92/02* (2013.01); *H04W 92/06* (2013.01); *H05K 999/99* (2013.01); *H04L 65/1106* (2022.05); *H04M 7/006* (2013.01); *H04M 2203/1091* (2013.01); *H04M 2215/208* (2013.01); *H04Q 2213/13034* (2013.01); *H04Q 2213/1307* (2013.01); *H04Q 2213/13091* (2013.01); *H04Q 2213/13098* (2013.01); *H04Q 2213/13109* (2013.01); *H04Q 2213/13176* (2013.01); *H04Q 2213/1318* (2013.01); *H04Q 2213/13196* (2013.01); *H04Q 2213/13204* (2013.01); *H04Q 2213/1322* (2013.01); *H04Q 2213/13224* (2013.01); *H04Q 2213/13296* (2013.01); *H04Q 2213/13348* (2013.01); *H04Q 2213/13384* (2013.01); *H04Q 2213/13389* (2013.01); *H04Q 2213/13405* (2013.01); *H04Q 2213/13407* (2013.01); *H04W 4/20* (2013.01); *H04W 8/12* (2013.01); *H04W 40/00* (2013.01); *H04W 76/19* (2018.02); *H04W 76/20* (2018.02); *H04W 76/22* (2018.02); *H04W 76/28* (2018.02); *H04W 76/30* (2018.02); *H04W 80/00* (2013.01); *H04W 84/16* (2013.01)

(58) Field of Classification Search
CPC ............. H04L 65/1053; H04L 65/1069; H04L 65/1023; H04M 3/42314; H04M 15/00; H04M 15/57; H04M 15/63; H04M 15/8292; H04M 3/42042; H04M 7/006; H04M 2203/1091; H04M 2215/208; H04Q 3/0025; H04Q 3/0045; H04Q 3/62; H04Q 3/72; H04Q 2213/13034; H04Q 2213/1307; H04Q 213/13091; H04Q 2213/13098; H04Q 2213/13109; H04Q 2213/13176; H04Q 2213/1318; H04Q 2213/13204; H04Q 2213/1322; H04Q 2213/13224; H04Q 2213/13296; H04Q 2213/13384; H04Q 2213/13389; H04Q 2213/13405; H04Q 2213/13407; H04W 76/02; H04W 76/022; H04W 92/02; H04W 40/30; H04W 4/16; H04W 4/20; H04W 8/12; H04W 40/00; H04W 76/028; H04W 76/041; H04W 76/06; H04W 80/00; H04W 84/16; H04W 88/16; H04W 92/06

See application file for complete search history.

(56) References Cited

U.S. PATENT DOCUMENTS

| | | |
|---|---|---|
| 5,402,472 A | 3/1995 | Melampy et al. |
| 5,570,420 A | 10/1996 | Bress et al. |
| 5,711,008 A * | 1/1998 | Gallant ................ H04W 76/20 370/328 |
| 5,815,707 A | 9/1998 | Krause et al. |
| 6,047,051 A | 4/2000 | Ginzboorg et al. |
| 6,047,124 A | 4/2000 | Marsland |
| 6,058,178 A | 5/2000 | McKendry et al. |
| 6,181,935 B1 | 1/2001 | Gossman et al. |

(56) References Cited

U.S. PATENT DOCUMENTS

| | | | |
|---|---|---|---|
| 6,219,409 B1 | 4/2001 | Smith et al. | |
| 6,317,594 B1* | 11/2001 | Gossman | H04M 3/42127 |
| | | | 455/414.1 |
| 6,351,648 B1 | 2/2002 | Karapetkov et al. | |
| 6,353,886 B1 | 3/2002 | Howard et al. | |
| 6,404,746 B1 | 6/2002 | Cave et al. | |
| 6,609,148 B1 | 8/2003 | Salo et al. | |
| 6,658,469 B1 | 12/2003 | Massa et al. | |
| 6,675,218 B1 | 1/2004 | Mahler et al. | |
| 6,701,162 B1 | 3/2004 | Everett | |
| 6,711,689 B2 | 3/2004 | Lumme et al. | |
| 6,799,041 B1 | 9/2004 | Dressel et al. | |
| 6,804,221 B1 | 10/2004 | Magret et al. | |
| 6,879,680 B2 | 4/2005 | Donovan et al. | |
| 6,885,658 B1 | 4/2005 | Ress et al. | |
| 6,925,063 B2 | 8/2005 | Goldshtein et al. | |
| 6,970,719 B1 | 11/2005 | McConnell et al. | |
| 6,978,308 B2 | 12/2005 | Boden et al. | |
| 7,035,935 B1 | 4/2006 | Voois et al. | |
| 7,039,037 B2 | 5/2006 | Wang et al. | |
| 7,042,988 B2 | 5/2006 | Juitt et al. | |
| 7,050,792 B2 | 5/2006 | Chou et al. | |
| 7,054,308 B1 | 5/2006 | Conway | |
| 7,054,637 B2 | 5/2006 | Weigand | |
| 7,058,165 B2 | 6/2006 | Koskinen et al. | |
| 7,117,267 B2 | 10/2006 | Bavadekar | |
| 7,154,995 B1 | 12/2006 | Wilson et al. | |
| 7,164,927 B1 | 1/2007 | Koch et al. | |
| 7,206,582 B2 | 4/2007 | Tom et al. | |
| 7,215,663 B1 | 5/2007 | Radulovic | |
| 7,239,877 B2 | 7/2007 | Corneille et al. | |
| 7,260,384 B2 | 8/2007 | Bales et al. | |
| 7,299,877 B2 | 11/2007 | Welton et al. | |
| 7,302,702 B2 | 11/2007 | Hippelainen | |
| 7,324,473 B2* | 1/2008 | Corneille | H04L 63/105 |
| | | | 455/411 |
| 7,340,046 B2 | 3/2008 | Mcclung et al. | |
| 7,342,905 B1 | 3/2008 | Mickos et al. | |
| 7,359,720 B2 | 4/2008 | Hartmaier et al. | |
| 7,369,540 B1 | 5/2008 | Giroti | |
| 7,380,124 B1 | 5/2008 | Mizell et al. | |
| 7,382,881 B2 | 6/2008 | Uusitalo et al. | |
| 7,389,533 B2 | 6/2008 | Bartlett et al. | |
| 7,398,552 B2 | 7/2008 | Pardee et al. | |
| 7,406,330 B2 | 7/2008 | McConnell et al. | |
| 7,536,437 B2 | 5/2009 | Zmolek | |
| 7,623,458 B2 | 11/2009 | Ayyagari et al. | |
| 7,624,431 B2 | 11/2009 | Cox et al. | |
| 7,630,706 B2 | 12/2009 | Weigand | |
| 7,643,412 B1 | 1/2010 | Mitchell et al. | |
| 7,643,416 B2 | 1/2010 | Pardee et al. | |
| 7,680,481 B2 | 3/2010 | Ejzak et al. | |
| 7,711,357 B2 | 5/2010 | Ewert et al. | |
| 7,805,126 B2 | 9/2010 | Koskinen et al. | |
| 7,815,106 B1 | 10/2010 | McConnell | |
| 7,818,565 B2 | 10/2010 | Miller et al. | |
| 7,843,901 B2 | 11/2010 | Silver et al. | |
| 7,873,001 B2 | 1/2011 | Silver | |
| 7,890,084 B1 | 2/2011 | Dudziak et al. | |
| 7,890,096 B2 | 2/2011 | Silver | |
| 7,940,904 B2 | 5/2011 | Cai et al. | |
| 7,957,348 B1 | 6/2011 | Gallagher et al. | |
| 7,974,618 B2 | 7/2011 | Silver | |
| 8,014,273 B1 | 9/2011 | Barrett et al. | |
| 8,948,752 B2 | 2/2015 | Siegel et al. | |
| 8,976,798 B2 | 3/2015 | Border et al. | |
| 9,112,873 B2 | 8/2015 | Wakefield | |
| 9,820,162 B2 | 11/2017 | Wang et al. | |
| 2002/0010758 A1 | 1/2002 | Chan | |
| 2002/0019246 A1 | 2/2002 | Forte | |
| 2002/0064267 A1* | 5/2002 | Martin | H04Q 3/0054 |
| | | | 379/207.02 |
| 2002/0098855 A1 | 7/2002 | Hartmaier et al. | |
| 2002/0098858 A1 | 7/2002 | Struhsaker | |
| 2002/0136226 A1 | 9/2002 | Christoffel et al. | |
| 2002/0159439 A1* | 10/2002 | Marsh | H04W 24/02 |
| | | | 370/352 |
| 2002/0159440 A1* | 10/2002 | Mussman | H04L 65/1101 |
| | | | 370/352 |
| 2002/0168968 A1 | 11/2002 | Glass | |
| 2002/0193107 A1 | 12/2002 | Nascimento | |
| 2003/0009556 A1 | 1/2003 | Motobayashi et al. | |
| 2003/0028650 A1* | 2/2003 | Chen | H04L 12/4641 |
| | | | 709/229 |
| 2003/0076781 A1 | 4/2003 | Enomoto et al. | |
| 2003/0081752 A1 | 5/2003 | Trandal et al. | |
| 2003/0091028 A1 | 5/2003 | Chang et al. | |
| 2003/0095569 A1 | 5/2003 | Wengrovitz et al. | |
| 2003/0105799 A1 | 6/2003 | Khan et al. | |
| 2003/0138080 A1 | 7/2003 | Nelson et al. | |
| 2003/0142807 A1 | 7/2003 | Dolan et al. | |
| 2003/0142810 A1 | 7/2003 | Kozic et al. | |
| 2003/0169727 A1 | 9/2003 | Curry et al. | |
| 2003/0172264 A1 | 9/2003 | Dillon | |
| 2003/0219022 A1 | 11/2003 | Dillon et al. | |
| 2004/0001482 A1 | 1/2004 | Yeom | |
| 2004/0009749 A1 | 1/2004 | Arazi et al. | |
| 2004/0062264 A1 | 4/2004 | Adams | |
| 2004/0063432 A1 | 4/2004 | Borsan | |
| 2004/0081173 A1* | 4/2004 | Feather | H04L 9/40 |
| | | | 370/395.54 |
| 2004/0083295 A1 | 4/2004 | Amara et al. | |
| 2004/0086093 A1 | 5/2004 | Schranz | |
| 2004/0095945 A1 | 5/2004 | Woog | |
| 2004/0116119 A1 | 6/2004 | Lewis et al. | |
| 2004/0151136 A1* | 8/2004 | Gage | H04L 69/18 |
| | | | 370/395.5 |
| 2004/0190698 A1 | 9/2004 | Kowalski | |
| 2004/0193694 A1 | 9/2004 | Salo et al. | |
| 2004/0193695 A1 | 9/2004 | Salo et al. | |
| 2004/0210522 A1 | 10/2004 | Bissantz et al. | |
| 2004/0236965 A1 | 11/2004 | Krohn | |
| 2005/0025126 A1* | 2/2005 | Patfield | H04L 12/6418 |
| | | | 370/352 |
| 2005/0030908 A1 | 2/2005 | Lehmann et al. | |
| 2005/0060328 A1 | 3/2005 | Suhonen et al. | |
| 2005/0066328 A1 | 3/2005 | Lam | |
| 2005/0091407 A1 | 4/2005 | Vaziri et al. | |
| 2005/0164693 A1 | 7/2005 | Yach et al. | |
| 2005/0170854 A1 | 8/2005 | Benco et al. | |
| 2005/0177515 A1 | 8/2005 | Kalavade et al. | |
| 2005/0193103 A1 | 9/2005 | Drabik | |
| 2006/0019667 A1 | 1/2006 | Hicks | |
| 2006/0023657 A1* | 2/2006 | Woodson | H04W 8/18 |
| | | | 370/328 |
| 2006/0025139 A1* | 2/2006 | Bales | H04W 48/02 |
| | | | 455/445 |
| 2006/0025140 A1 | 2/2006 | Bales et al. | |
| 2006/0030357 A1 | 2/2006 | McConnell et al. | |
| 2006/0036641 A1 | 2/2006 | Brydon et al. | |
| 2006/0072726 A1 | 4/2006 | Klein et al. | |
| 2006/0116127 A1* | 6/2006 | Wilhoite | H04W 36/24 |
| | | | 455/442 |
| 2006/0142010 A1* | 6/2006 | Tom | H04L 65/4038 |
| | | | 455/445 |
| 2006/0171402 A1 | 8/2006 | Moore et al. | |
| 2006/0209797 A1 | 9/2006 | Anisimov et al. | |
| 2006/0229090 A1 | 10/2006 | LaDue | |
| 2006/0233180 A1 | 10/2006 | Serghi et al. | |
| 2006/0236388 A1 | 10/2006 | Ying et al. | |
| 2006/0239252 A1 | 10/2006 | Kantak et al. | |
| 2006/0246951 A1 | 11/2006 | Calabrese et al. | |
| 2006/0293057 A1 | 12/2006 | Mazerski et al. | |
| 2006/0294245 A1 | 12/2006 | Raguparan et al. | |
| 2007/0058611 A1 | 3/2007 | Doradla et al. | |
| 2007/0060196 A1* | 3/2007 | Sharma | H04L 65/103 |
| | | | 455/552.1 |
| 2007/0070948 A1 | 3/2007 | Kezys et al. | |
| 2007/0070976 A1 | 3/2007 | Mussman et al. | |
| 2007/0091848 A1 | 4/2007 | Karia et al. | |
| 2007/0100981 A1 | 5/2007 | Adamczyk et al. | |
| 2007/0143500 A1 | 6/2007 | Wilhelm | |
| 2007/0160015 A1 | 7/2007 | Andriantsiferana | |

(56) References Cited

U.S. PATENT DOCUMENTS

| | | |
|---|---|---|
| 2007/0165802 A1 | 7/2007 | Fox |
| 2007/0186106 A1 | 8/2007 | Ting et al. |
| 2007/0195803 A1 | 8/2007 | Lowery et al. |
| 2007/0201433 A1 | 8/2007 | Croak et al. |
| 2007/0201641 A1 | 8/2007 | Bar et al. |
| 2007/0206563 A1 | 9/2007 | Silver et al. |
| 2007/0209059 A1* | 9/2007 | Moore ............... H04L 63/0853 726/2 |
| 2007/0211695 A1* | 9/2007 | Shi .................... H04L 12/66 370/352 |
| 2007/0291733 A1 | 12/2007 | Doran et al. |
| 2009/0299788 A1 | 12/2009 | Huber et al. |
| 2010/0272096 A1* | 10/2010 | Witzel ............... H04L 65/104 370/352 |
| 2011/0200034 A1 | 8/2011 | Delveaux et al. |
| 2015/0156684 A1 | 6/2015 | Labauve et al. |
| 2015/0382280 A1 | 12/2015 | Gray et al. |
| 2017/0071009 A1 | 3/2017 | Huang et al. |
| 2018/0027573 A1 | 1/2018 | Cariou et al. |
| 2018/0028573 A1 | 2/2018 | Sadowsky et al. |
| 2019/0124695 A1 | 4/2019 | Seok et al. |
| 2019/0208423 A1 | 7/2019 | Cherian et al. |
| 2019/0313328 A1 | 10/2019 | Ma et al. |

FOREIGN PATENT DOCUMENTS

| | | |
|---|---|---|
| EP | 1239684 A2 | 9/2002 |
| EP | 1545096 A1 | 6/2005 |
| EP | 1608103 A2 | 12/2005 |
| EP | 1608103 A3 | 1/2006 |
| EP | 1608103 B1 | 2/2007 |
| EP | 1239684 A3 | 5/2007 |
| EP | 1545096 B1 | 7/2008 |
| EP | 1239684 B1 | 10/2011 |
| JP | 2004104827 A | 4/2004 |
| KR | 20040039548 A | 5/2004 |
| WO | 0007391 A1 | 2/2000 |
| WO | 2000007391 A1 | 2/2000 |
| WO | 0069156 A1 | 11/2000 |
| WO | 2000069156 A1 | 11/2000 |
| WO | 2004030434 A2 | 4/2004 |
| WO | 2004030434 A3 | 7/2004 |
| WO | 2005004448 A1 | 1/2005 |
| WO | 2005022838 A1 | 3/2005 |
| WO | 2005122510 A1 | 12/2005 |
| WO | 2006036641 A1 | 4/2006 |

* cited by examiner

CURRENT SITUATION-SEPARATE ENTERPRISE AND CARRIER NETWORKS

GATEWAY SERVER SYSTEM COMPONENTS

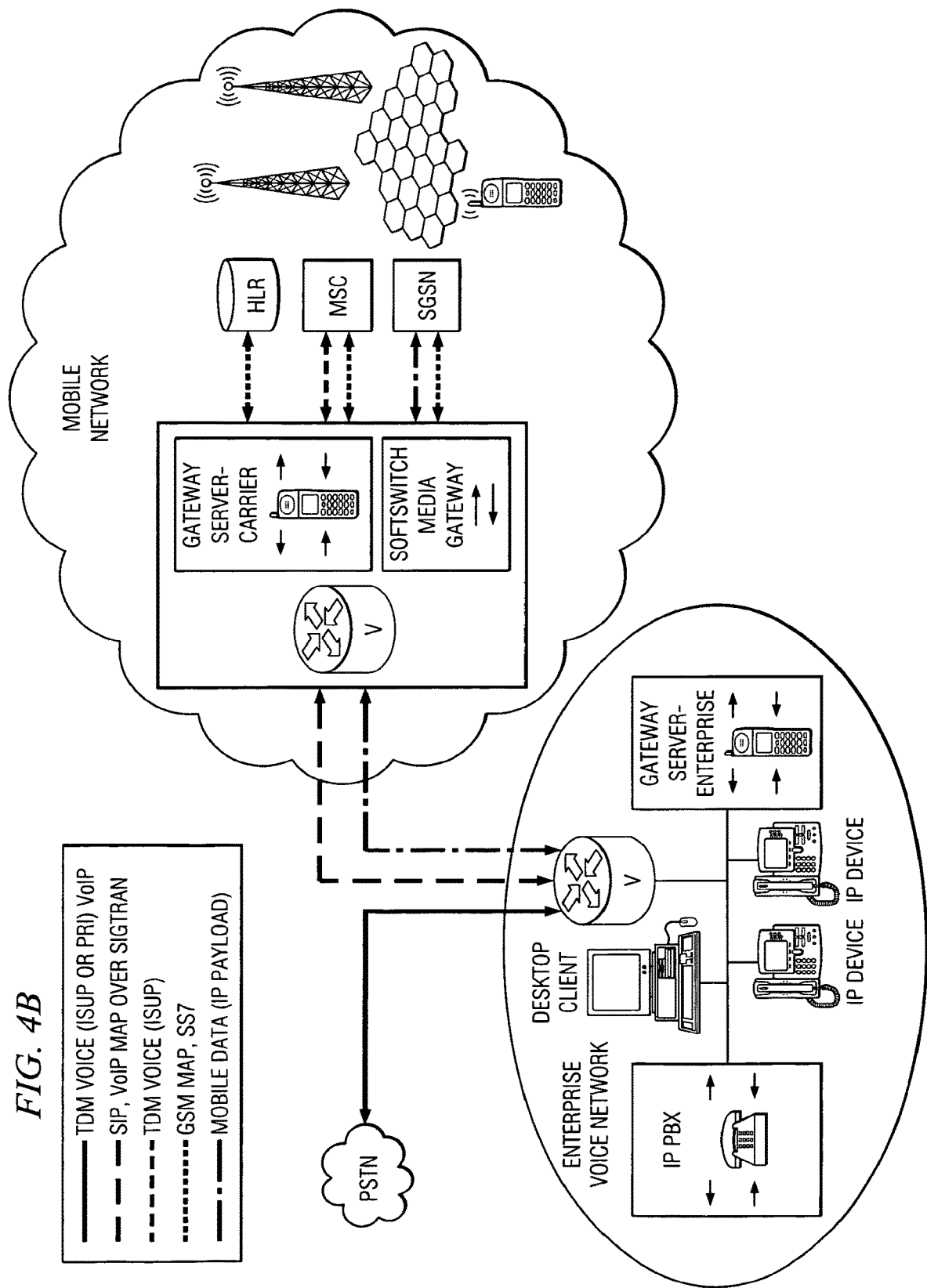

OUTGOING CALL HANDLING FLOW CHART

INCOMING CALL HANDLING FLOW CHART

SYSTEM AND METHOD FOR EXECUTING ORIGINATING SERVICES IN A TERMINATING NETWORK FOR IMS AND NON-IMS APPLICATIONS

CROSS REFERENCE TO RELATED APPLICATIONS

This application is a continuation of U.S. Ser. No. 16/890,886, filed on Jun. 2, 2020, now U.S. Pat. No. 11,412,435, issued on Aug. 9, 2022, which is a continuation of U.S. Ser. No. 14/970,232, filed on Dec. 15, 2015, now U.S. Pat. No. 10,674,419, issued Jun. 2, 2020, which is a continuation of U.S. Ser. No. 11/509,200, filed Aug. 24, 2006, now U.S. Pat. No. 9,215,319, issued Dec. 15, 2015, which claims priority of U.S. Provisional Ser. No. 60/778,252, filed Mar. 2, 2006; U.S. Provisional Ser. No. 60/778,276, filed Mar. 2, 2006; U.S. Provisional Ser. No. 60/778,443, filed Mar. 2, 2006; and U.S. Provisional Ser. No. 60/797,724, filed May 4, 2006, the entire disclosures of which are incorporated herein by reference.

Cross reference is made to the following commonly assigned U.S. patent applications: U.S. Ser. No. 11/588,027, entitled "SYSTEM AND METHOD FOR ENABLING CALL ORIGINATIONS USING SMS AND HOTLINE CAPABILITIES" filed Oct. 26, 2006, issued U.S. Pat. No. 7,890,096, issued Feb. 15, 2011; U.S. Ser. No. 11/509,186, entitled "CALL FLOW SYSTEM AND METHOD USE IN LEGACY TELECOMMUNICATION SYSTEM" filed Aug. 24, 2006, issued U.S. Pat. No. 7,843,901, issued Nov. 30, 2010; U.S. Ser. No. 11/509,260, entitled "CALL FLOW SYSTEM AND METHOD USE IN VOIP TELECOMMUNICATION SYSTEM" filed Aug. 24, 2006, issued U.S. Pat. No. 7,873,032, issued Jan. 18, 2011; U.S. Ser. No. 11/509,450, entitled "SYSTEM AND METHOD FOR ENABLING MULTI-LINE MOBILE TELEPHONE SERVICE CAPABILITIES ON A SINGLE-LINE MOBILE TELEPHONE" filed Aug. 24, 2006, issued U.S. Pat. No. 8,958,346, issued Feb. 17, 2015; U.S. Ser. No. 11/509,372, entitled "SYSTEM AND METHOD FOR ENABLING DTMF DETECTION IN A COIP NETWORK" filed Aug. 24, 2006, issued U.S. Pat. No. 7,903,635, issued Mar. 8, 2011, each of which is hereby incorporated by reference for all purposes.

FIELD OF THE INVENTION

The present invention relates to telecommunications, and more particularly telecommunications including enterprise servers, wireless communications, and the interoperability of communication technologies.

BACKGROUND OF THE INVENTION

Corporations are increasingly relying on the use of cellular technology by their employees. Yet enterprises do not have adequate means to control cellular service, in terms of costs, Quality of Service, and corporate monitoring. This is because cellular service is independently managed and controlled by wireless carrier networks with no connectivity to the enterprise voice and data networks, as shown in FIG. 1.

Enterprises today control their enterprise fixed voice and data networks, as is shown on the left of the diagram. They own and manage their own PBXs, within each branch, and between branch offices. They also own and manage their own data networks and corporate LAN/WAN. They purchase bulk voice minutes and data capacity from land line carriers, or from other providers that have purchased bulk minutes and data capacity from carriers, to connect branch offices, using public IP Network providers (e.g. MCI, Sprint, L3, etc.) for Data and Voice over IP (VoIP).

With this invention, the enterprise is able to equally extend this paradigm to cellular service by connecting the public wireless voice and data network (on the right side of the diagram) into the enterprise. This is shown in FIG. 2. The gateway server inter-connects the carrier's Mobile Switching Center (MSC) that manages cellular voice traffic as well as the carrier's Serving GPRS Support Node (SGSN) that manage cellular data traffic, with the enterprise's voice and data network.

SUMMARY OF INVENTION

The invention achieves technical advantages as a mobile application gateway for connecting devices on a cellular network with individual networks, such as enterprise voice and data networks and/or residential networks. The effects of the present invention are far reaching in terms of transferring effective call control from the cellular network into the control of the individual network such as the enterprise, and enabling new business models for the purchase of cellular service from a public cellular carrier by an enterprise. The invention may consist of a primarily of core network and services components based on the IMS network architecture, and is backward compatible to support legacy systems in place in current telecom and data networks.

BRIEF DESCRIPTION OF THE DRAWINGS

FIG. 4B is a diagram of an enterprise data and voice network operably connected using the gateway server system using split call control according to one preferred embodiment;

DETAILED DESCRIPTION OF THE PRESENT INVENTION

Figure 1:
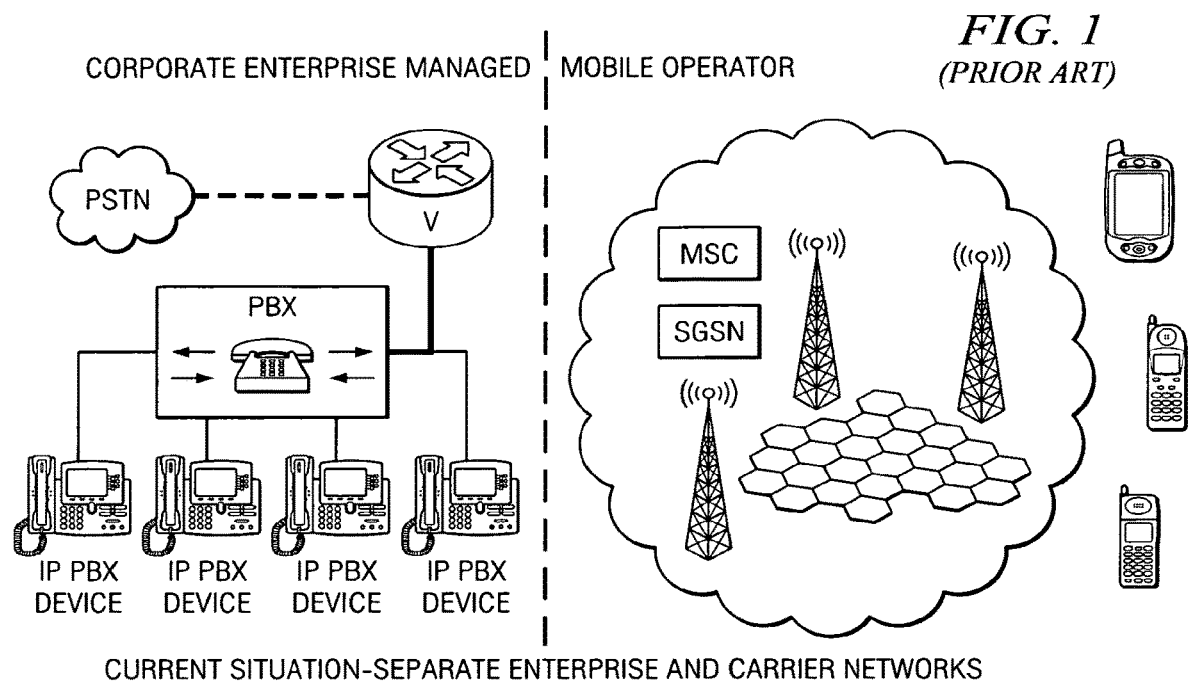
FIG. 1 is a block diagram of an independently managed and controlled wireless carrier network, and an independently managed corporate enterprise network.

Effectively in one preferred embodiment of the invention, a gateway mobile server is provided that runs a turnkey cellular system that does not include any radio network components. The gateway mobile server is appropriately scaled down to the smaller subscriber base of a large enterprise, compared with that of a public carrier. The gateway mobile server advantageously supports call routing between a legacy, hybrid or IP-PBX, and the public cellular network in support of the enterprise/virtual operator business model.

This solution ultimately enables enterprises to change the way they purchase cellular service from cellular operators by enabling enterprises to effectively become a Mobile Virtual Network Operator (MVNO) for their own employees, and ultimately even sell cellular service external to the enterprises corporation. Thus, the enterprise is able to purchase discount bulk rate cellular minutes of use from a public cellular carrier, and "resell" them internally to their cost centers, or externally to other entities. The solution effectively enables the enterprise to "plug-in" cellular service akin to how local and long distance are connected to the enterprise's PBX. The result is that enterprises can consume minutes of use from public cellular carriers and pay for those minutes at the end of a time period, for example at the end of the month. A single relationship can exist between the cellular carrier and the enterprise, rather than multiple individual subscriptions between the carrier and enterprise employees (where the carrier is forced to treat them as ordinary consumers). This embodiment of the invention also facilitates the situation in which a single service provider can provide local, long distance, cellular and internet service to an enterprise. Ultimately the enterprise can become its own service provider with its own Home Location Register (HLR) and Home Subscriber Server (HSS) operating on and interconnected with the public networks. Thus, employees making/receiving voice calls and data sessions can be roaming on cellular carrier networks, which will charge the enterprise based on their usage.

The voice gateway component in this embodiment of the invention comprises a hybrid gateway router, combining the traditional routing functionalities of a Wireless Gateway Mobile Switching Center (GMSC) with the admission control and routing functionalities of an IMS SIP Application Server proxy and/or H.323 gatekeeper in addition to functionality for call management and control in the enterprise space based on SIP and/or H.323.

All signaling is transported over IP instead of SS7 where possible using protocols, such as SIGTRAN. In cases where IP signaling is not available, SS7 may be required to connect with the public cellular and carrier networks. In addition, the invention supports functionality not traditionally associated with a Wireless GMSC. This includes support for 3GPP/2 SIP and/or H.323.

The present invention provides support for 3GPP/2 SIP, GSM MAP, CAP, ANSI-41/WIN and AIN protocols, converts between them and maps to individual SIP network elements in the enterprise network. Support for signaling is via SIGTRAN with high reliability over IP connections instead of traditional and expensive SS7 links.

Various embodiments of the invention provide technical advantages including:

Interconnection algorithms between carrier network telecom protocols and specific enterprise PBX services platforms, including enhancements to standard cellular network nodes including GMSC, SCP, GGSN:
  Nodal inter-connection algorithms
  Various Configurations
  Enterprise-hosted, Enterprise Managed:
  The solution is hosted entirely within the enterprise and controlled by the enterprise
  Enterprise-hosted, Shared Management:
  The solution is hosted entirely within the enterprise and controlled by both the enterprise and remotely by the carrier
  Enterprise hosted, Carrier Managed:
  The solution is hosted entirely within the enterprise and controlled remotely by the carrier
  Carrier-hosted, Enterprise Managed:
  The solution is hosted at the carrier site and controlled remotely by the enterprise
  Carrier-hosted, Shared Management:
  The solution is hosted at the carrier and controlled by both the enterprise and remotely by the carrier
  Carrier-hosted, Carrier Managed:
  The solution is hosted at the carrier site and controlled by the carrier
  Shared-hosted, Shared Management:
  A component of the solution is hosted, managed and controlled at the carrier site, and a component of the solution is hosted, managed and controlled at the enterprise site.
  Routing of dialed digits from carrier network to enterprise system without modifying carrier software, using existing intelligent network and/or IMS signaling and data messaging techniques.
  Method for reducing/eliminating of PSTN interconnect charges between carrier and enterprise, enabling:
  Low cost mobile-to-mobile calls even when served by different carriers
  This may be achieved by routing the calls from the carrier network into the enterprise using VoIP technology, and thus bypassing the PSTN network
  Low cost mobile to IP voice client calls (mobile to PC client, Skype, etc.)
  Methods for increasing enterprise-grade availability via a cellular interconnection gateway:
  Methods for maintaining enterprise call handling capabilities when individual enterprise network nodes fail For example, when a call is originated from the cellular network and its control messages are sent to the gateway server for processing, if the gateway server detects that the PBX system is not available or out of service, the gateway server can instruct the cellular network to route the call directly. The gateway server may modify the digits if necessary. The cost of the call may be higher than if routed through the PBX, however the call will nevertheless be connected. Once the PBX becomes available, the gateway server can direct subsequent calls through the enterprise network.

Enterprise MVNO Business framework

Enabling large enterprises to become cellular service providers for their employees Spinoff business opportunities for sale of cellular voice/data services PBX evolution for wireless interconnection MVNO Infrastructure Framework, methodology and mechanisms for increasing MVNO value-chain service capabilities Framework to enable MVNOs to support own core network switching and services through an existing carrier's wireless access infrastructure Integrated Services Capabilities Framework Enabling improved integration and customization of enterprise applications on public carrier networks Framework enables the migration of business solutions to customized enterprise environment, away from generic carrier offerings using enterprise information systems not available to carrier networks, e.g.

Local Presence & Availability Information

Enterprise badging and security systems

For example, with the call control managed out of the enterprise rather than the cellular network, the enterprise can connect disparate systems to enforce policy controls such as disabling an employee's cellular phone when they badge out of the office for the evening, or changing the charging codes such that the employee will be charged for calls made after they have badged out of the office for the evening, or limiting the employee to 250 minutes of personal phone calls after badging out for the evening, or restricting international calling, or enabling international calling to a single country such as the country of one's family, etc.

Intelligent Least cost routing techniques

Algorithms for enabling intelligent Tail-end Hop-off of calls and data sessions within the enterprise's network Including methodology for inter-office (e.g. international) call routing when local PBX is out of service Tail-end hop-off enables a call from one country to another country to be routed over a least-cost network to a connection point in the destination country, from which a local call is established and connected with the international least-cost route. The result is a lower-cost call to the destination.

Data Session Management

Similar to the ability to route voice calls into the enterprise which are then subject to enterprise voice policy, the invention describes the methodology and support for the routing of data sessions from the public network directly into the enterprise. By including a GGSN function within the enterprise and connected with the cellular carrier's SGSN, a secure tunnel can be established between the carrier and the enterprise networks. The GGSN component can be split among two components of the Gateway Server: One component located in the carrier network (within the GS-C), and a second component located in the enterprise (within the GS-E). Similarly this can be achieved with a Home Agent function located within the enterprise and connected with the carrier's Foreign Agent for CDMA networks. As such, the invention:

Eliminates the need for VPN software to be launched on the mobile device

Subjects the mobile device to enterprise data policy including security and firewalls no matter where the device is located, and without the need for user interaction—all data sessions are routed through the enterprise's corporate network and firewalls Enables software applications to be embedded in wireless devices that can be launched remotely to, for example, destroy data on the device should the unit be lost or stolen—e.g. Poison Pills The present invention in one embodiment includes a software/server system that advantageously provides a cost effective and transparent means to connect enterprise employees' cellular phones to their corporation's PBX. The solution provides corporations with the ability to achieve, with regular single-mode mobile phones used by employees without requiring any special dialing sequences, the same PBX based benefits now provided for fixed office landline phones. The solution creates a multi-dimensional paradigm shift in the enterprise telecommunications market that is expected to change the way enterprises purchase and integrate cellular service with their PBX as well as the way carriers compete for all phone services to the enterprise.

The solution provides a unique product and business concept that is highly strategic for enterprise customers and channel distribution partners. Mobile operators have the opportunity to benefit from enterprises' need for operational control, efficiency and flexibility. The solution drives competitive advantage, higher market share and increased revenues for network operators by extending the cellular network and its call control into the enterprise.

One implication of moving the call control into the enterprise is that the invention enables the enterprise to control their communications—enabling the enterprise to track, monitor and even record voice conversations that occur on public carrier networks. The enterprise will be able to enforce policy-based call routing for employees making and receiving calls on public cellular networks. This means they can allow/prevent calls based on specific criteria such as destinations, time of day, external stimuli (e.g. active employee badge), other circumstances. As a result, corporations submitting to control-procedure legislations such as Sarbanes-Oxley will now have the ability to manage and control cellular communications in line with their landline (PBX) and data networks (e.g. e-mail traffic).

The gateway server transparently extends the cellular network directly to the PBX in the enterprise, ultimately enabling the enterprise to equally 'plug' cellular service into their PBX from a choice of providers, alongside their local and long distance landline service. In the enterprise, the server according to one aspect of the present invention is a mobility gateway that enables the enterprise to manage its own cellular services and costs as well as to deploy customized mobility solutions to bridge their internal business applications and processes with mobile devices. The architecture addresses the extension of the PBX control over both cellular voice and data systems, in addition to the current PBX control over land line voice. The approach of the present invention is a networking solution versus a device-centric solution, and does not require the enterprise to deploy and manage complex RF (radio frequency) components or purchase specialized mobile devices.

For the enterprise, the solution enables them to manage and control their cellular services & costs by routing all employees' cellular voice and data calls through their corporate PBX network, while simultaneously enabling them to deploy customized and secure mobility solutions integrated with their internal IT systems. For the mobile operator, the solution enables them to capture market share, grow revenues, reduce operational expenses and reduce churn in the highly profitable enterprise segment.

Figure 3:
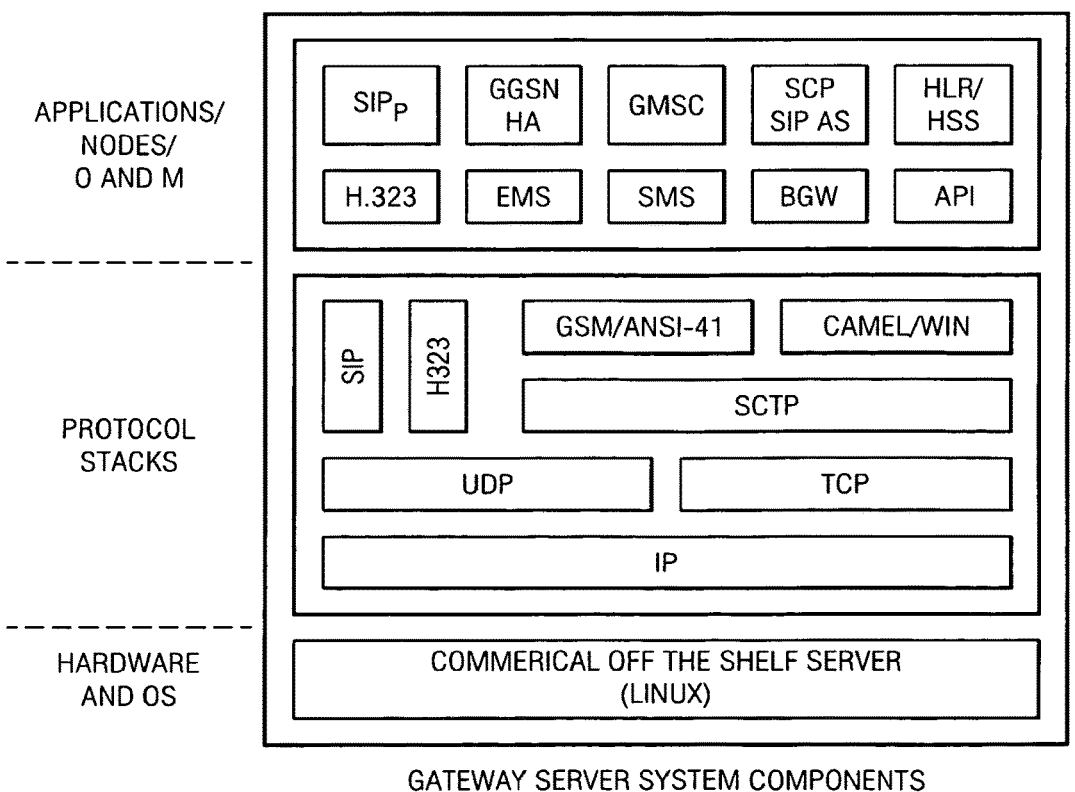
FIG. 3 is a diagram of a gateway server system accordingly to one preferred embodiment of the present invention.
Figure 2:
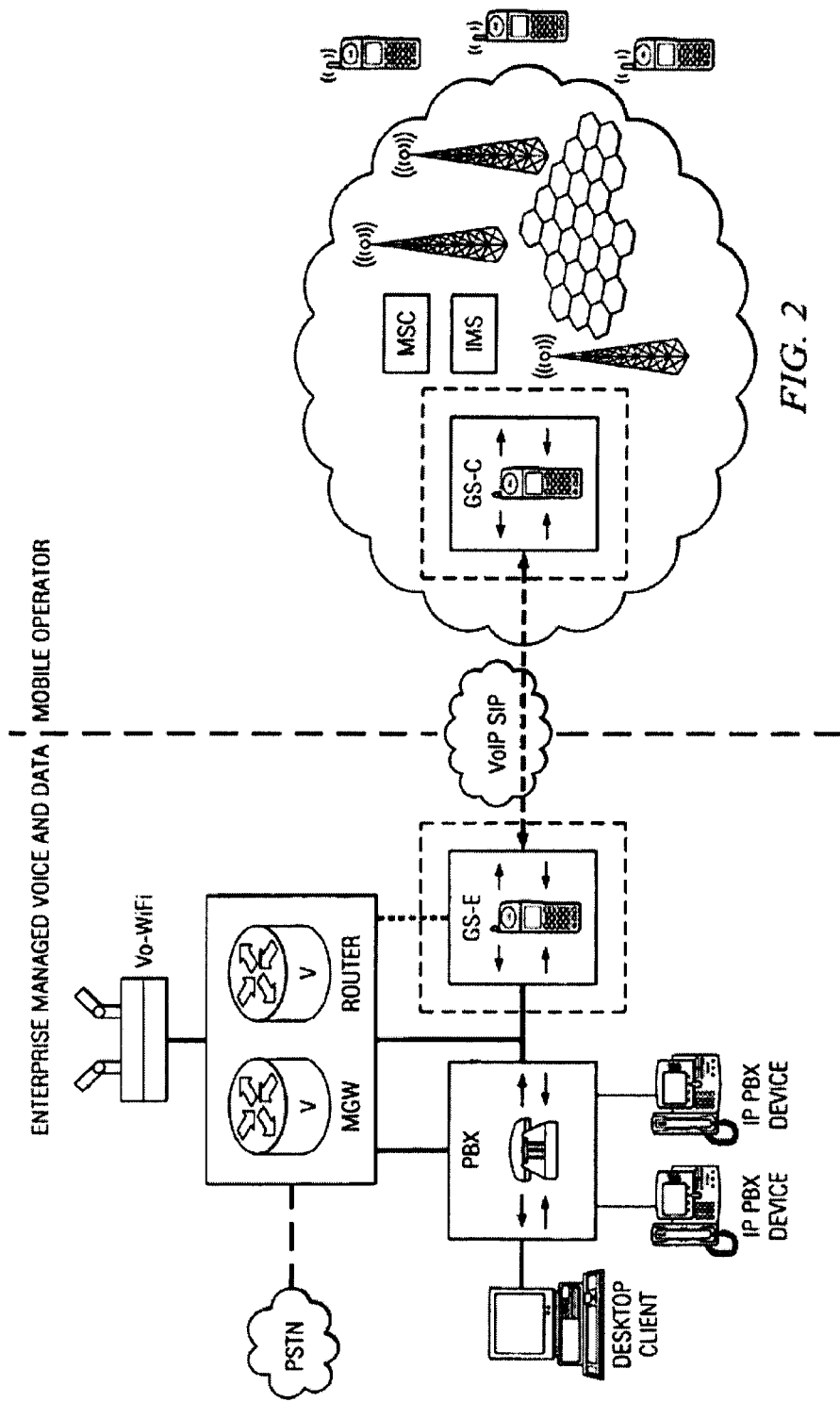
FIG. 2 is a diagram of a conventional network with an enterprise network gateway server, according to the invention, connected to a wireless carrier network.

Referring now to FIG. 3, there is shown a gateway server at 10 according to one preferred embodiment of the invention.

The Gateway Server:

Enables the enterprise to manage and control its cellular service.

Enables the enterprise to achieve significant overall cost reductions for telecommunications.

Includes an overall platform and architecture for improved and integrated wireless enterprise solutions.

Drives convergence between the enterprise's cellular and Voice over IP (Internet Protocol) infrastructure.

The gateway server 10 leverages the benefits of Voice over IP with cellular to extend the cellular network into the enterprise. The gateway server 10 addresses both cellular voice and data, and is a networking solution that works together with the enterprise's existing PBX, performing mobile call control functions (routing and services).

Additionally, the gateway server 10:

Bridges the enterprise PBX and public cellular environments to enable telecom applications for the cellular user, such as short-code dialing (e.g. 4 and 5-digit dialing), one number service (one phone number for the desktop and cellular phone), single voice mail box.

Enables the enterprise to leverage their existing telecom assets for cellular use (e.g., least-cost routing over corporation's VoIP or leased-lines network for discounted long distance; use of existing PBX voicemail system).

Is an application platform for deploying mobile IT applications. Either the enterprise IT department or a Systems Integrator can develop and integrate specific applications to interface with the corporation's cellular devices.

For example, the enterprise can choose to replace the deskphone of an office employee with an inexpensive mobile phone. For this employee, when they 'badge-out' of the building at the end of the day, the enterprise security badging system can be used to inform the gateway server to de-activate the mobile phone, until the employee returns to the office and 'badges-in' the next morning. Alternatively, the gateway server can track and record the calls made outside the office hours, and enable the enterprise to charge them to the business, to the employee, or record them as a corporate benefit.

Provides a single control point for the IT organization to monitor and control cellular usage and services—all cellular calls can be tracked and recorded in the enterprise's PBX system.

The gateway server may be software-only solution that can execute on standard, inexpensive Linux platforms. The gateway server may consist of a mobile core network (for call handling and routing) and services network (voice and data services such as PBX-based short code dialing, voicemail, conference calling, VPN, etc.) components. It may be appropriately scaled down to the smaller subscriber base of a decentralized large enterprise, in the order of hundreds to several thousand subscribers, compared with carrier systems that manage many millions of "centralized" subscribers. The gateway server is designed to be managed and maintained by the same IT group that currently manages the enterprise's PBX system.

The gateway server in some aspects is a cellular system which does not require or include any radio frequency network components—which are highly complicated and expensive to deploy and manage. Campus radio networks, whether cellular, Wi-Fi or other, require highly skilled and dedicated resources to maintain and ensure network stability for the enterprise's critical voice and data communications, while simultaneously managing their spatial coexistence with live public carrier radio networks overlapping the enterprise campus.

Instead, the invention includes a method for combining the technology for enabling enterprises to integrate its call control and services with a proven business model (MVNOs) that further enables the enterprise to negotiate with carriers for a reasonable discounted price to use the carrier's professional nationwide cellular network. To the carrier, this maintains large numbers of high-value enterprise customers locked in on their networks, while reducing their costs of acquiring and maintaining individual subscribers.

One network architecture implementing an aspect of the present invention is shown in FIG. 4. From an IT organization perspective, the gateway server 10 appears as an extension to the PBX. To the cellular network, the gateway server 10 appears as a standard in-network endpoint for delivering calls. To the enterprise PBX, the gateway server 10 appears as a set of standard PBX endpoints (e.g. deskphones, or IP clients). The gateway server 10 mediates between the two disparate sets of network protocols and state machines.

The gateway server 10 includes the network functions for both voice (gateway MSC) and data (gateway GPRS Support Node or Home Agent), VoIP capability for interconnecting the mobile network with the enterprise thereby eliminating PSTN interconnect charges, a billing gateway, and a next-generation Network Services gateway (platform enabling third party value added services for the enterprise (e.g. mobile phone activation/de-activation, corporate directory integration) based on IMS (IP Multimedia Subsystem). It also includes the element management subsystem (EMS) and a service management subsystem (SMS) for the operational support system (OSS). The following Legend identified some of the terms used in FIG. 4.

Legend

GPRS: General Packet Radio Services—Provides mobility management, session management and transport for Internet Protocol packet services in GSM cellular packet networks.

GSM: Global System for Mobile Communications (GSM) is the most popular standard for mobile phones in the world. GSM is both an air interface and networking protocol. In the US this protocol is used by T-Mobile and Cingular. The most popular alternative combines the CDMA (Code Division Multiple Access) air interface protocol and ANSI-41 networking protocol that are used in the US by Verizon Wireless and Sprint.

HLR: Home Location Register—The central database that contains details of each mobile phone subscriber that is authorised to use the cellular core network.

IETF: Internet Engineering Task Force—Is charged with developing and promoting Internet standards, in particular, those of the IP protocol suite IP: Internet Protocol—A data-oriented protocol used by source and destination hosts for communicating data across a packet-switched internetwork ISDN: Integrated Services Digital Network—A type of circuit switched telephone network system, designed to allow digital transmission of voice and data over ordinary telephone copper wires ISUP: ISDN User Part—Part of the Signaling System #7 which is used to set up telephone calls in Public Switched Telecom Networks.

MAP: Mobile Application Part (MAP)—A GSM protocol that provides an application layer for the various nodes in the core mobile network to communicate with each other in order to provide services to mobile phone users MSC: Mobile Switching Center—The component of a cellular system that carries out switching functions and manages the communications between mobile phones and the Public Switched Telephone Network.

PRI: Primary Rate Interface—A telecommunications standard for carrying multiple voice and data transmissions between two physical locations.

PSTN: Public Switched Telephone Network—The concentration of the world's public circuit-switched telephone networks, in much the same way that the Internet is the concentration of the world's public IP-based packet-switched networks.

SGSN: Serving GPRS Support Node—The component of a cellular system that keeps track of the location of an individual mobile station and performs security functions and access control for Internet Protocol packet services in GSM cellular packet networks.

SIGTRAN: The name given to an IETF working group that produced specifications for a family of protocols that provide reliable datagram service and user layer adaptations for SS7 and ISDN communication protocols.

SS7: Signaling System #7—A set of telephony signaling protocols which are used to set up the vast majority of the world's PSTN telephone calls.

TDM: Time Division Multiplexing—A method for sending multiple digital signals along a single telecommunications transmission path.

VoIP: Voice over Internet Protocol—The routing of voice conversations over the Internet or any other IP-based network.

Configurations: The solution enables various configurations to be deployed.

Figure 4A:
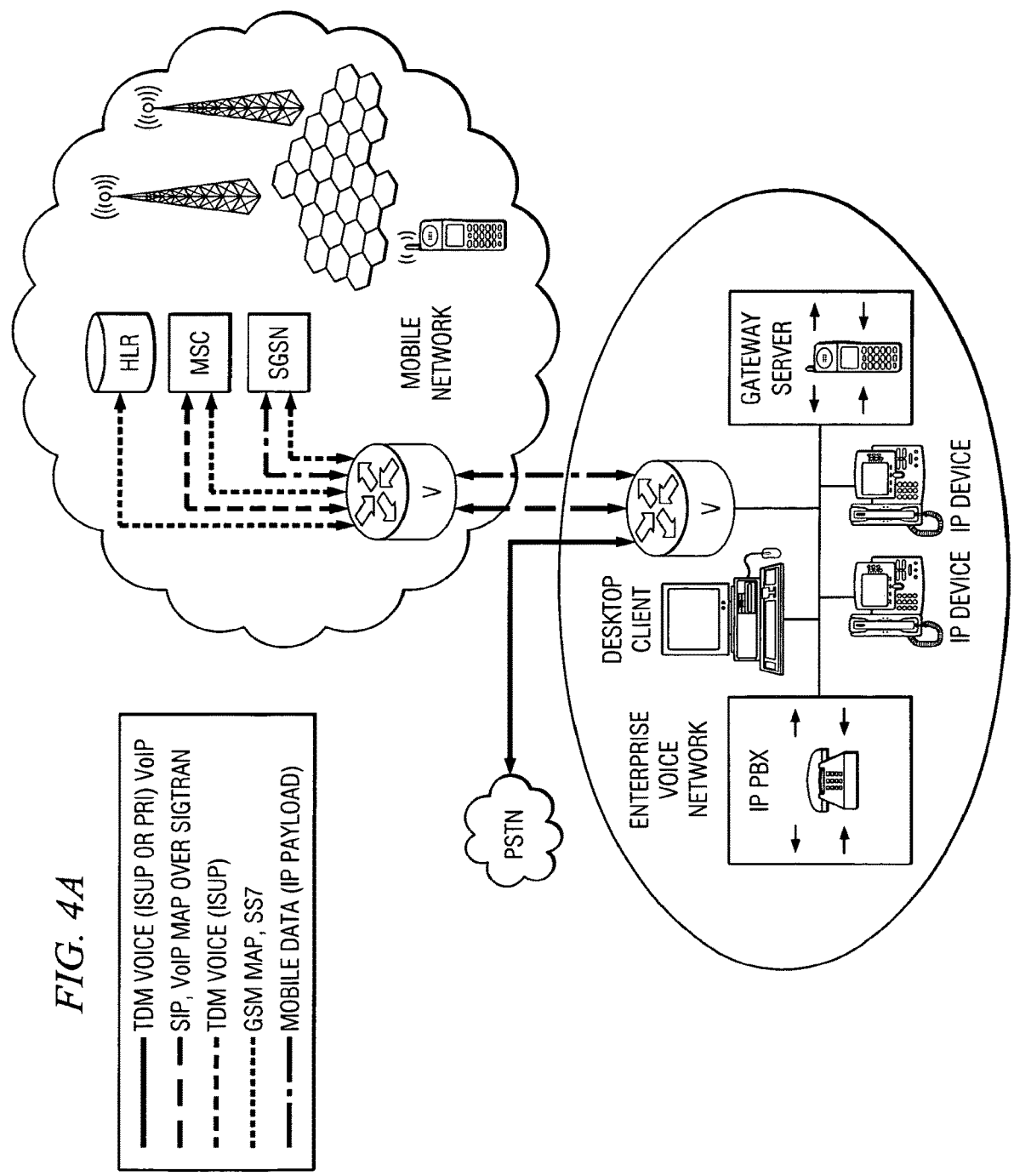
FIG. 4A is a diagram of an enterprise data and voice network operably connected using the gateway server system using pure enterprise call control according to one preferred embodiment.

Pure enterprise call control in which the GS is located at the enterprise site (GS-E) as shown in FIG. 4A (denoted as GS). The GS-E interfaces with the cellular network nodes supporting SS7 and SIP or other messaging with the carrier network. The carrier network must be able to address the GS-E in order to send and receive messages.

Split call control between carrier and enterprise in which the GS located at the enterprise (GS-E) interacts with a GS at the carrier (GS-C) as shown in FIG. 4B. The connection between the GS-E and the GS-C can be SIP or other protocols. This configuration typically enables the carrier network to have a central point of control for interacting with multiple enterprises, and may not require the use of SS7 messaging to the enterprise—instead it is possible to have a secure IP connection supporting SIP. This is also useful for offering a Centrex solution for interconnecting with a carrier-hosted PBX, or for interconnecting a carrier-hosted GS with enterprise-hosted PBX systems. The GS-C supports an SS7 point code multiplexer in which only one or two point codes are needed to address all enterprises, since the GS-C can identify for which enterprise the message is intended. The GS-E is able to provision the GS-C automatically over the IP interface to manage subscribers, e.g. to add new pilot DNs for new subscribers. In this case the triggers used by the originating and terminating triggers used in the cellular network for routing the calls to the GS-C can add identifying information of the specific enterprise in the triggering messages (e.g. ORREQ). Alternatively the GS-C can identify the enterprise based on the calling party information.

The following description is based on FIG. 4A and illustrates one operation of the invention. When an employee originates a call, the information is transmitted to the MSC where the subscriber's profile is examined. The subscriber profile, previously downloaded to the MSC from the HLR when the subscriber activated and registered on the network, contains information that might say they have no voicemail service (since they are using the enterprise voicemail system), no three-way calling capability (since they are using the enterprise conference bridge capabilities), and have an Intelligent Network trigger for call originations, terminations and mid-call triggers. These triggers direct the MSC to query an SCP (Service Control Point) to analyze the digits dialed and decide on how to continue to route the call. The SCP is addressed using standard SS7 point codes. Alternatively, in an IMS architecture, the SCP can be an IMS SIP Application Server that is addressed via IP addressing instead of an SS7 point code. The gateway server acts as the SCP and receives the message where it communicates with the PBX to determine the routing of the call based on criteria such as whether the call should be directed into the enterprise to send to a local device, redirect over corporate least-cost methods, requires monitoring, or if the call should be routed directly by the carrier if, for example, the destination is to another subscriber on the same network in the same calling area and does not need to be monitored. The gateway server then responds to the MSC with the routing instructions. In the case where it has been decided to route the call into the enterprise, the MSC may be instructed to route the call over the PSTN network, or alternatively and preferred, the MSC may be instructed to route the call to a soft-switch which will connect the cellular TDM call waiting in the MSC to a Media Gateway which will convert the TDM to VoIP and route the IP-based voice traffic to the enterprise. The media is then redirected at the enterprise to the destination by either the gateway server or the PBX. In some cases, the gateway server may act as a back-to-back user agent (B2BUA) to the PBX in which the incoming call from the MSC is directed to be routed to a destination that is the B2BUA via the PBX. The gateway server, acting as the B2BUA, can then establish a new call leg to the original destination through the PBX (based on the information received when the gateway server was acting as the SCP/IMS SIP Application Server), and then connect the incoming call from the MSC to the new call leg.

Current enterprise PBX systems are developed to be 'enterprise grade' in terms of their reliability and availability, compared with carrier network systems which are 'carrier grade' with failover solutions to prevent or minimize interruption of service. Enterprise PBX systems are by design not as reliable as carrier networks. With the gateway server solution of the present invention, overall system availability is increased as the gateway server intermediates between the carrier and enterprise networks. If the PBX goes down, the gateway server 10 can instruct the carrier to route calls on behalf of the enterprise until the PBX is back in service. In the event that the gateway server 10 should go out of service, the architecture of the invention is such that the carrier network will automatically take over the calls, with only nominal delays in routing (for example, a timeout event may occur in the MSC, after which the MSC will continue).

Many cellular carriers today allow free calling between subscribers on the same networks (e.g. Verizon to Verizon, T-Mobile to T-Mobile). This is partly because the call is maintained within the cellular carrier's own network, thus no PSTN (Public Switched Telephone Network) interconnect charges apply to the carrier. In addition, to call from a cellular phone on one carrier to a cellular phone on another carrier, or from a cellular phone to a landline phone requires the call be routed through the PSTN, thus incurring PSTN interconnect charges to the carrier.

Figure 5:
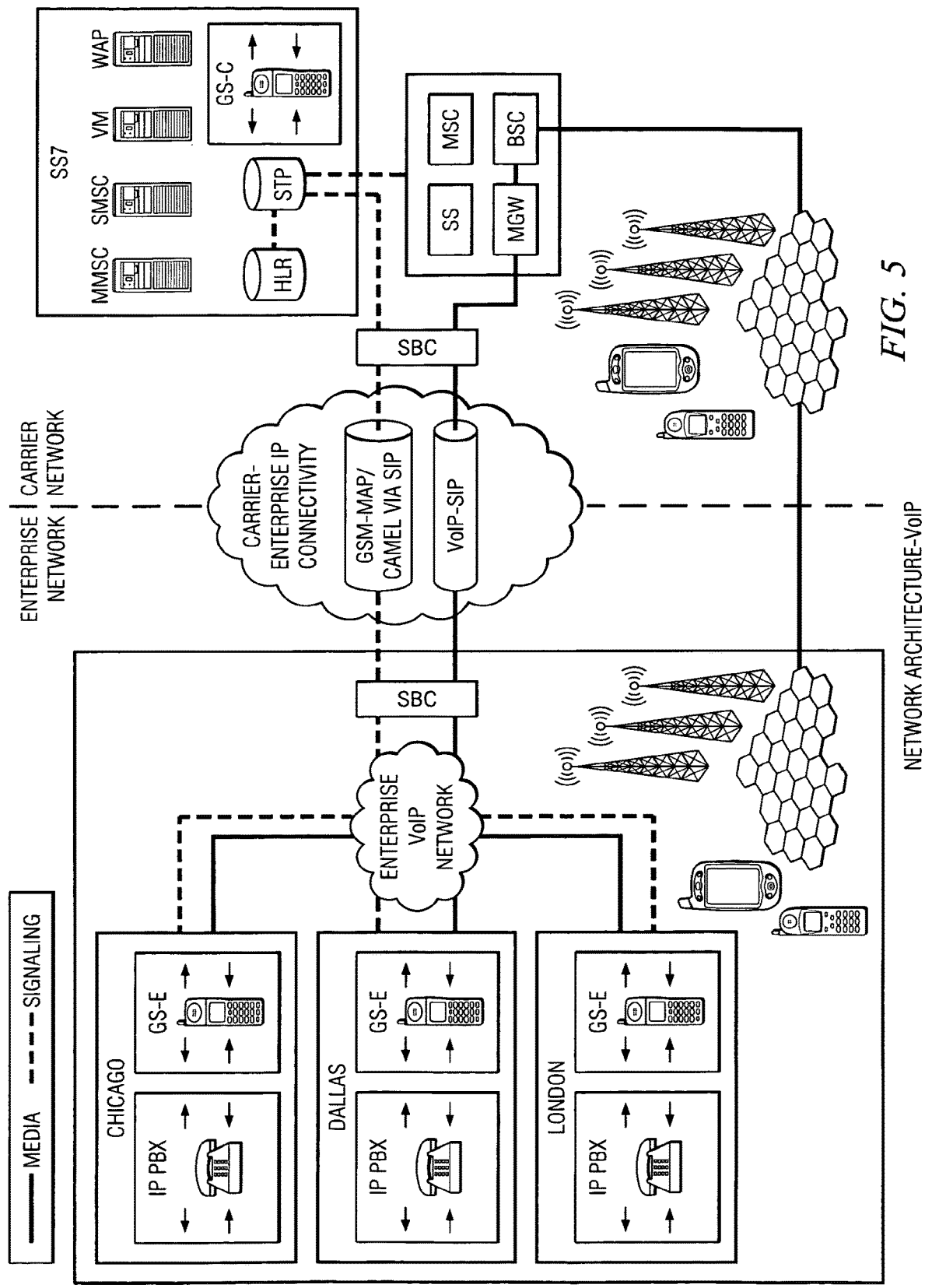
FIG. 5 depicts a network architecture according to another preferred embodiment using VoIP systems.

One architecture of the present invention as shown in FIG. 5 employs VoIP (Voice over Internet Protocol) to interconnect the carrier's cellular network, via a managed IP network or the Internet, with the enterprise network, eliminating PSTN interconnect charges to the carrier where allowed (certain countries do not allow bypassing PSTN interconnect). As a result, employing this solution enables cellular calls from an enterprise user on one cellular network to connect with another enterprise user on a different cellular network without incurring PSTN interconnect charges for either cellular carrier thereby reducing the cost for the cellular carriers to service the enterprise calls. This is because the call is routed by the gateway server from the first cellular carrier into the enterprise using VoIP, and from the enterprise out to the terminating cellular carrier using VoIP.

Similarly, cellular calls from enterprise users to landline phones are also transitioned from the cellular network to the enterprise over VoIP, and are connected with the PSTN at the enterprise's PBX instead of being connected to the PSTN from the cellular network. Again, this reduces the cost for the cellular carrier to service enterprise calls.

For the enterprise, PSTN interconnect charges are included as part of the landline subscription. North American landline calling plans are typically 'all-you-can-eat', with no per-minute charges for local PSTN interconnection. In Europe and other parts of the world, landline calls are charged per time interval (e.g. per minute, or per 6-second interval), however at a substantially lower connection charge than for cellular calls.

The diagram of FIG. 5 outlines the architecture using VoIP between the carrier and the enterprise. The Gateway Server-Carrier (GS-C) is located in the carrier site. The Gateway Server-Enterprise (GS-E) is located in the various enterprise sites. GS-C supports carrier network SS7 and IP signaling within the carrier's network environment. The GS-C may contain information about multiple enterprises that use the present invention including information about the individual enterprise network configurations. The GS-C may also contain certain subscriber information for employees of the enterprise that assists the GS-C in optimally routing the calls or handle emergency situations. The GS-C communicates with the GS-E sites to determine if the cellular call should be routed into the enterprise network, and if so what is the closest point of attachment. Advantageously, the interface between the GS-C and GS-E is typically all IP-based—SIP, SIGTRAN or even an encapsulation of cellular protocols such as GSM MAP or ANSI-41 within IP or SIP. The GS-E interfaces with the enterprise PBX. Once the optimal routing is defined, the GS-E informs the GS-C. The GS-C communicates with the carrier's softswitch and media gateway to establish a bearer path that converts the TDM voice from the MSC to VoIP to be delivered to the enterprise. Once the bearer is connected with the enterprise, it is redirected to the appropriate destination using the bearer resources of the enterprise, such as VoIP connections to other offices, leased lines, or PSTN. The signaling and bearer traffic may traverse Session Border Controllers at the carrier and enterprise sites.

Figure 6:
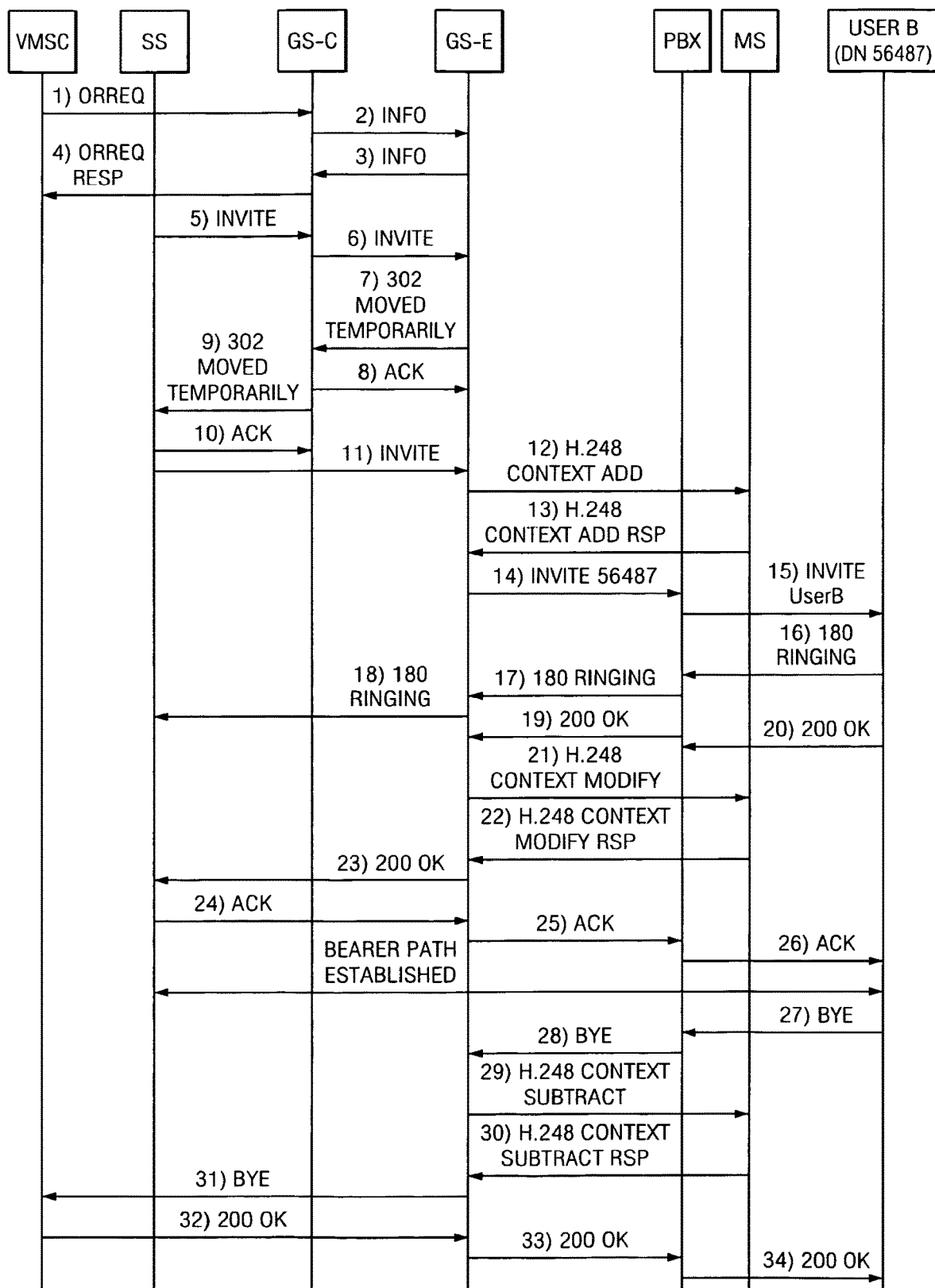
FIG. 6 is a call flow diagram for call origination according to one embodiment of the present invention.

One preferred call flow for Call origination is shown in FIG. 6, and is as follows:
1. Origination Request received from Wireless Network
2. Info message used to query GS-E about mobile origination policy for subscriber
3. info message received by GS-C with mobile origination policy
4. Response is returned to ORREQ giving GS-C as the destination of the call
5. SS routes call to GS-C
6. GS-C—conveys the now call initiation to the GS-E
7. GS-E provides routing information to GS-C to get the mobile subscriber's call to route to their home PBX
8. Receipt of routing information is acknowledged by GS-C
9. The call is responded to providing the new contact address for GS-E.
10. Rerouting response is acknowledged
11. The call invitation is routed to GS-E
12. Media Server ports are requested—so that digits dialed can be capture for feature invocation
13. The media server responds with the ports allocated.
14. GS-E sends the call invite to the PBX for routing to the intended destination—user B
15. The PBX forwards on the Call invite to the User 8
16. User B indicates that ringing is occurring
17. The PBX sends the ringing indication onto the GS-E box
18. The GS-E box propagates the ringing indication to the wireless network
19. User 8 answers the call
20. Answer is sent by PBX to GS-E
21. GS-C provides the destination port information to the Media Server
22. Media Server acknowledges request
23. GS-C sends response to call onto wireless network
24. Answer is acknowledged by wireless network
25. GS-C propagates the acknowledgment to the PBX
26. PBX propagates the acknowledgment to User B
27. User B hangs up the call
28. PBX propagates the BYE to GS-E
29. GS-E, releases the media Server context
30. Media Server acknowledges the release
31. GS-E propagates the Bye to the wireless network.

Figure 7:
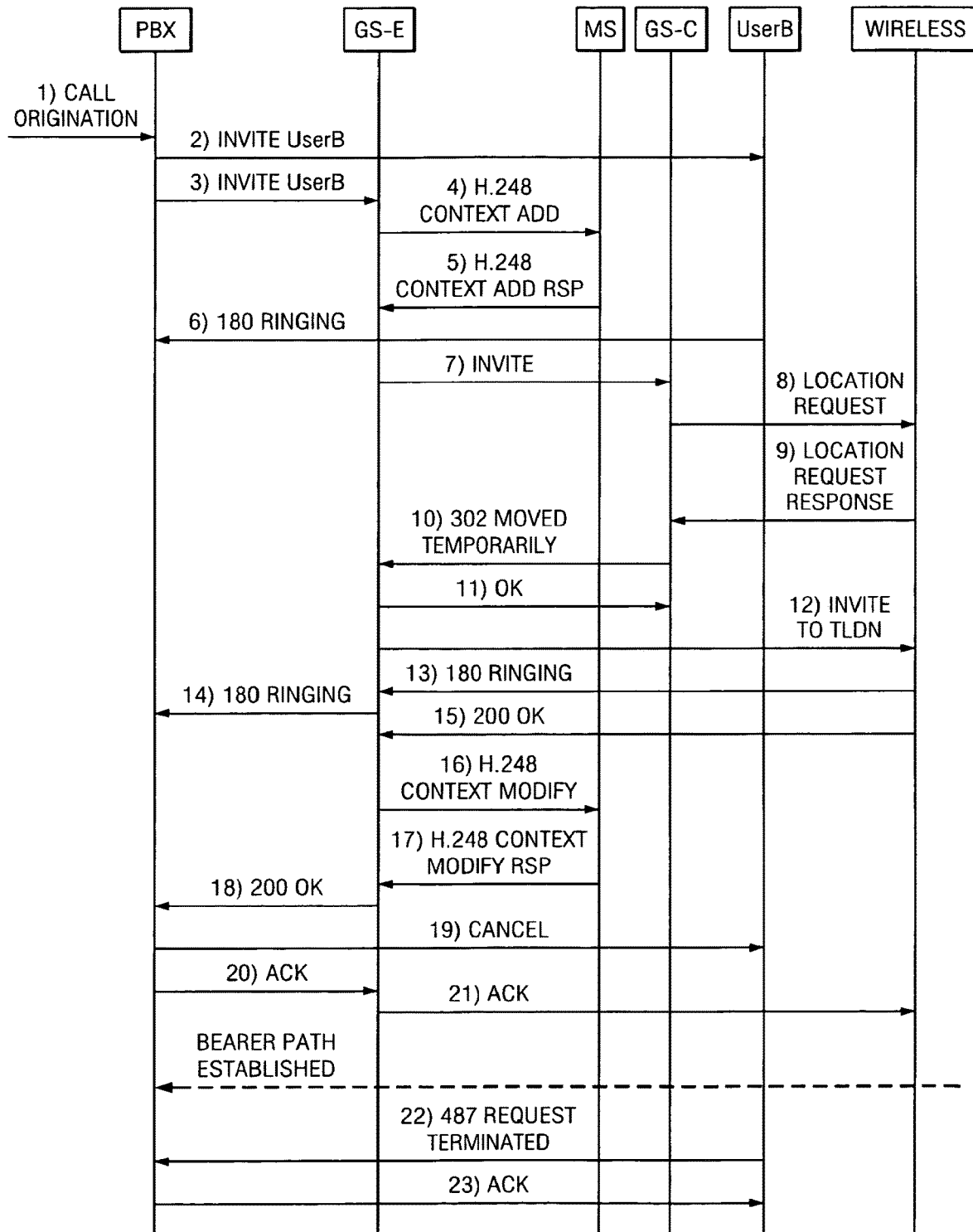
FIG. 7 is a call flow diagram for effecting call delivery using VoIP system according to another preferred embodiment of the present invention.

One preferred call flow for effecting Call Delivery using VoIP is shown in FIG. 7 and is as follows:
1. Call Originates to PBX
2. PBX delivers call invite to User B desktop phone
3. PBX forks the call—delivers call invite to GS for wireless user
4. GS-E allocates a media port to insert into the call path
5. Media Server acknowledges media resource allocation
6. User B indicates that ringing is occurring on desktop phone
7. Invite for mobile phone is sent into GS-C
8. GS-C using the Location Request—asks for the Temporary Routing number required to deliver call to endpoint
9. Wireless network responses with the TLDN
10. GS-C tells GS-E to redirect the call to the TLDN
11. 302 Response is acknowledged
12. GS-E routes the call to the TLDN
13. Wireless network indicates that ringing is occurring on wireless phone 14. GS-E propagates ringing to PBX for wireless end point
15. Wireless phone indicates that call has been answered
16. GS-E box modifies media context to include the wireless port number information
17. Media server acknowledge update of media context
18. GS-E sends OK to PBX to acknowledge answer of call
19. PBX cancel the call log to User B
20. PBX acknowledges call answer to GS-E
21. GS-E propagates ACK to wireless network
22. User B acknowledges the cancel request
23. PBX acknowledges receipt of the request terminated message.

Figure 8:
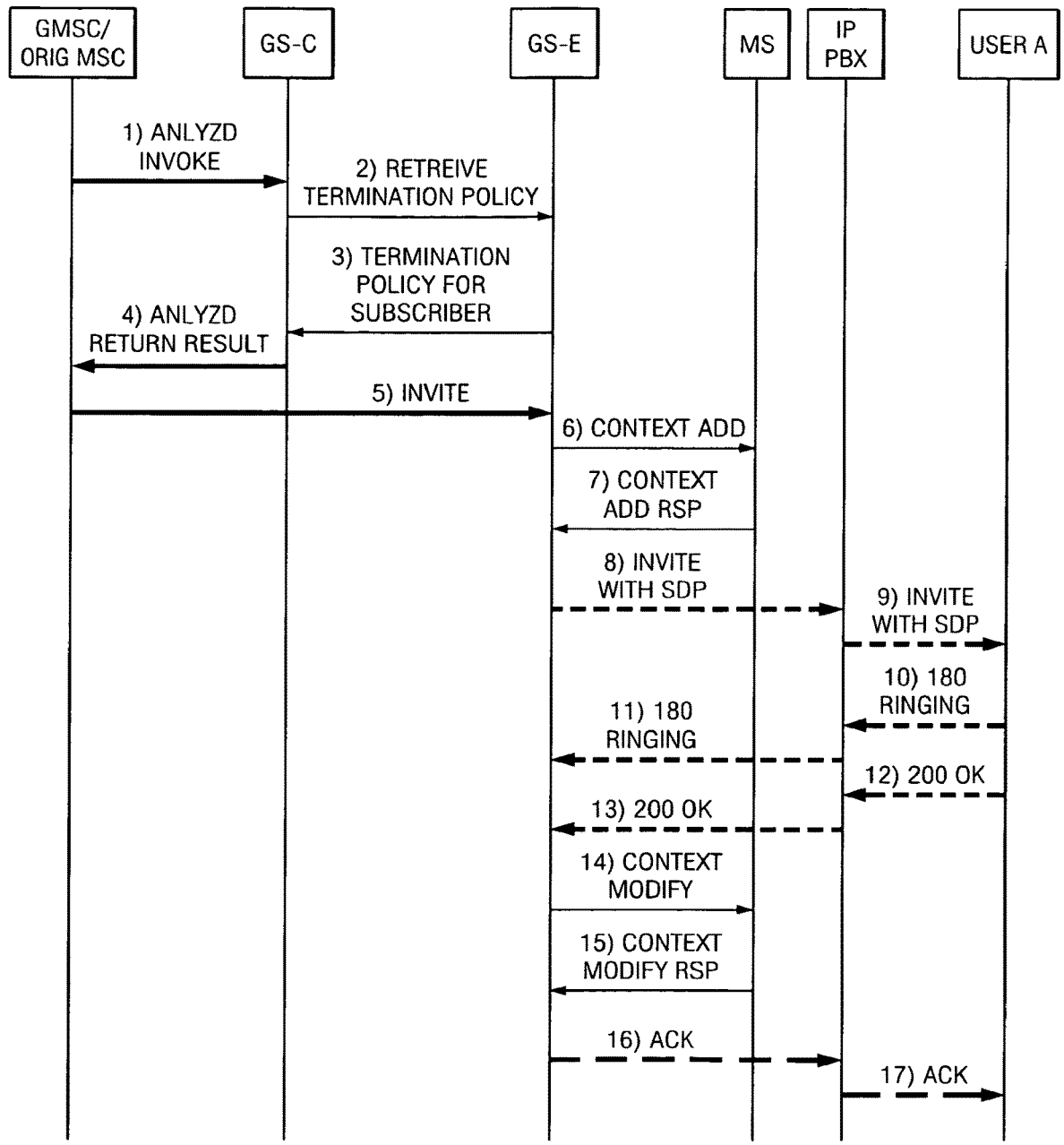
FIG. 8 is a call flow diagram for effecting mobile termination using VoIP according to another preferred embodiment of the present invention.
Figure 9:
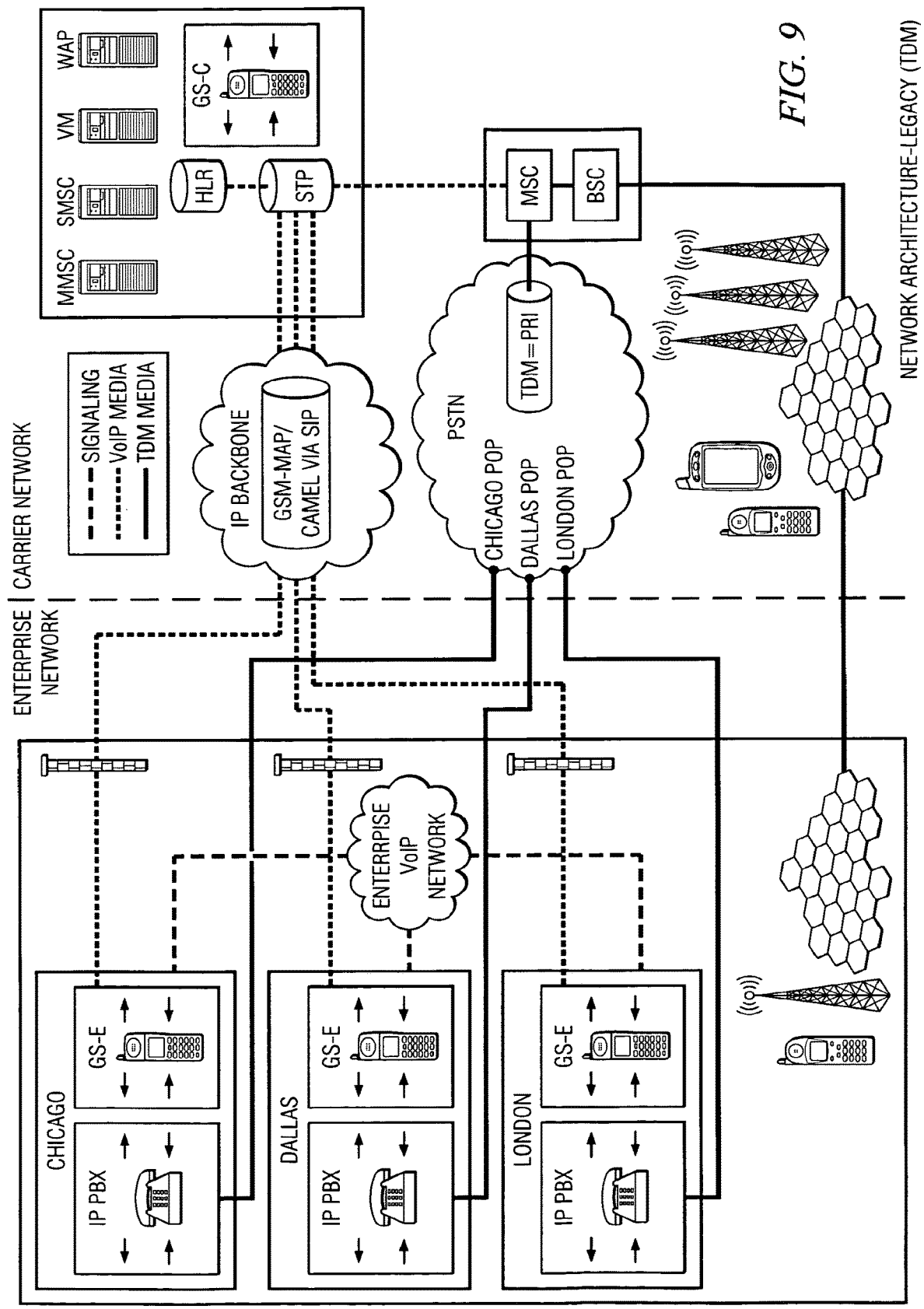
FIG. 9 is a diagram of a network architecture for a Legacy (TDM) network according to another preferred embodiment of the present invention.

One preferred call flow for effecting Mobile termination using VoIP is shown in FIG. 8 and is as follows:

1. Termination Trigger indicating that call has been terminated to Mobile number
2. GS-C requests termination policy from GSE
3. GS-E returns termination policy and based on policy routes call into enterprise for handling
4. GS-C reroutes call into Enterprise for handling
5. Call arrives at GS-E for handling
6. GS-E allocates media ports for feature invocation
7. Media Ports and allocate and response is returned\
8. GS-E ask PBX to route call to appropriate end point
9. PBX sends invite to end point
10. End Point starts ringing the end point
11. Ringing indication is sent back to GS-E
12. Endpoint answers the call
13. Response is relayed to GS-E
14. Media Ports are modified to reflect end point IP address/port
15. Media Server confirms that ports have been set up
17. Ack confirms that bearer path is set up to PBX
18. Ack confirms to end point that bearer path is set up

TABLE 1

| Benefit | Description |
| --- | --- |
| Increased personal and workgroup productivity | The gateway server's cellular access enables anytime, anywhere accessibility using the enterprise's corporate PBX network. Extending voice and other applications such as e-mail and instant messaging with mobility creates immediate productivity improvements. |
| Lower Long Distance Costs | Because the gateway server solution includes routing all enterprise users' cellular calls through the enterprise Voice over IP network, voice traffic is always routed efficiently and takes advantage of the enterprise's low cost long distance services. The higher volume of traffic also enables the enterprise to negotiate better rates from their long distance service provider. |
| Seamless integration with the enterprise PBX and IT applications | Using Voice over IP technology, the gateway server integrates seamlessly with the enterprise's existing PBX solution. Additionally, the gateway server provides a platform for tightly integrating wireless access with IT applications. Examples of these applications include e-mail, instant messaging, sales force automation, enterprise resource planning, field support, time reporting, customer billing, etc. |
| Control of a Mission Critical Service | The gateway server enables the enterprise to control its cellular service both from an administrative perspective and a disaster recovery perspective. For example, the gateway server lets the enterprise and/or the employee handle the provisioning of their own services. Additionally, the gateway server supports geographic redundancy, such that in the event of a disaster at one location, all control is transferred to the backup installation. |
| Leverages existing enterprise infrastructure | The gateway server solution allows the enterprise to re-use other voice and data infrastructure for both desktop and cellular use- One key example is the enterprise voice mail system: Both the desktop phone and wireless phone can forward to the same voice mail box operated by the enterprise. Message waiting indicators can be turned on and off on both phones simultaneously. |
| Enables "best-practices" control procedures | The gateway server enables the enterprise to monitor and record cellular phone calls, just as they can do with deskphone calls today. This supports "Sarbanes-Oxley"-like control procedures that are being implemented by major corporations for best practices. |
| Seamless cellular service, globally | The gateway server solution includes the necessary business agreements (including roaming agreements) to enable enterprise users to have seamless cellular access all over the world. |
| Higher Control for the Enterprise | Companies typically allow an employee to choose their own cellular phone, plan and carrier. Unlike the desktop phone, the company has no controls over how the employee uses the cellular phone. The gateway server solution provides for a policy-based service provisioning: Employees are given a profile which defines what kind of calls they can make.<br>Today, when the employee terminates their employment with the company, they keep their phone and cellular phone number. As the company's customers have been given this number, they will continue calling the employee after he has left the company. With the gateway server solution this situation will not occur as the company is now in control of both the mobile device and cellular number. Calls to an un-used number can be intercepted and handled appropriately. |
| Convenience of One Number | Enterprise users will no longer have to give out both desktop and cellular numbers. The gateway server solution integrates seamlessly with the enterprises PBX and enables advanced services like "One Number". |

TABLE 1-continued

| Benefit | Description |
| --- | --- |
| Single corporate wide dialing plan | The gateway server and the enterprise PBX can share a common dialing plan. This means that four or five digit dialing available on the desktop phone can also be used on the cellular phone (both in and out of the office). It also means that all cellular calls will be routed in the same way a call originated from a desktop is routed. |
| Lower Administration Costs | Using the gateway server solution, the enterprise always receives the lowest negotiated rate for both cellular voice and cellular data traffic. The gateway server decides whether to route the call into the enterprise to be routed over the enterprise network, or to instruct the cellular network to proceed with routing the call (for example, if one enterprise user is calling another enterprise user on the same cellular network, and neither user is marked for the conversation to be monitored). Neither the enterprise nor the employee have to evaluate the different plans the cellular operator offers and guess at which one would be best suited to the employee. Instead, all employees are part of the single corporate negotiated plan. Additionally, costs involved in expensing and reimbursing employee cellular phone costs are eliminated. |
| Security | As the gateway server includes the wireless data router, security vulnerabilities are reduced as data traffic is never "exposed" outside of the enterprise. |

The invention enables a multi-dimensional paradigm change that has profound effects on the overall industry, as it will not only change how enterprises purchase and use cellular service—but will ultimately impact the entire value chain for wireless and wireline service providers and manufacturers.

The gateway server 10 architecture enables the migration of centralized call control from the cellular carrier networks to distributed call control throughout individual enterprise networks. The gateway server 10 enables cellular service to effectively be "plugged-in" to the PBX, similar to how local and long distance service are connected to current PBXs.

As a result of gateway server 10 capability, enterprises are equipped for carriers to compete for the enterprise's cellular PBX service as they do today for local and long distance interconnection with the PBX. By winning the business, carriers will benefit from locking in large numbers of users while significantly reducing its sales, marketing, and acquisition costs since service minutes will be sold bulk to the enterprise as a whole, no longer to individual employees.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

Advantages of the gateway architecture are shown in Table 2.

TABLE 2

| | Situation without Gateway Server | Situation with Gateway Server |
| --- | --- | --- |
| Cost for Cellular Service | High Cost | Low Cost |
| Asset Reuse | No utilization of enterprise telecom assets | High utilization of enterprise telecom assets |
| Services | Purchase all services from carrier (e.g. Long Distance, Voicemail, 3-way calling, etc.) | Reuse corporate Voice over IP, least cost routing, voicemail, etc. |
| Devices | Each employee requires a deskphone and a separate cellular phone | Possibility to replace deskphone with cellular phone results in less equipment to support and less subscriptions |
| Move-Add-Changes (MACs) | MAC required every time employee changes offices for desk phone = time + expense | No MACs required for cellular-PBX users |
| Control of Cellular Usage | Low degree of control - managed exclusively by carrier | Higher degree of Control for enterprise |
| Rate | Individual cellular subscription plans | Bulk Rate discount minutes for all employees |
| On-Net Routing | Two-stage dialing required. Difficult to dial contacts | Automatic on-net routing, no user intervention required |
| Long Distance | Purchased from carrier - Included in service plan for national LD, charged separately for international at high rates | Bulk rate airtime minutes do not include Long Distance (lower cost to enterprise) - any LD calls (national or international) are routed over corporate VoIP network: "Forced on-net" |

TABLE 2-continued

| | Situation without Gateway Server | Situation with Gateway Server |
|---|---|---|
| Tail-end Hop Off | No Tail-end Flop Off | Tail-end Hop Off for long distance calls where permitted |
| Service Provider Relationship | Individual employee relationships with carrier | Single relationship into Service Provider for all corporate subscribers - Better leverage for negotiating supply, reduces minutes wasted in individual buckets |
| Sales, Marketing, Customer Care, Subsidies | Carrier subject to expenses for sales, marketing, subsidies per individual subscriber | Single relationship between enterprise & carrier: No individual sales, marketing, subsidies |
| Customer Care | Provided by carrier | Tier 1 provided by enterprise PBX IT department, Tier 2 by carrier |
| Expense Handling | Manual expense handling per employee | PBX tracks cellular calls - charges to appropriate cost center, like landline calls |
| VoIP Integration | No VoIP integration - all LD from carrier trunks | VoIP integration with carrier eliminates PSTN Interconnect charges; VoIP call routing on enterprise networks for LD |
| Policy and Control | No Policy control | Calls subject to PBX corporate policies per user (internal calling only, local calling allowed, national long distance allowed, international allowed) |
| Tracking | Tracking of cellular calls via printed subscriber bill only | Cellular calls automatically tracked in PBX |
| Call Monitoring | Cannot monitor or record cellular calls | Cellular calls can be monitored and recorded no matter where subscriber is located |
| Reconciliation | No reconciliation for cellular charges from carrier | Reconciliation of cellular calls tracked in PBX with carrier records |
| Integration with IT Applications | Little or no integration with corporate IT applications. | Can be integrated with corporate IT applications, e.g., Corporate Phone Directory, security/badging systems to activate/deactivate cellular phone, corporate ERP, CRM systems |
| Convergence | Cellular, Local and Long Distance from separate carriers | Possibility for single provider for Cellular, Local and Long Distance |
| One-Number service | Separate desk phone and cellular phone. | Opportunity for true single number for both cellular and desk phone |
| Device Acquisition Customization | Through carrier - no customization | Direct from manufacturers. Possibility to standardize corporate device strategy, customize to enterprise IT needs. |

Current Situation

Existing platforms for detecting DTMF digit events fall into one of the following two categories:

Category I) Required to be a terminating end-point for a call session

Category II) Expensive hardware-based solution

Category I) solutions do not allow the call server to provide mid-call services during an active two party call session and therefore do not provide the necessary functionality. Category II) solutions provide the necessary functionality but are too expensive and increase the hardware footprint too much to be viable solutions.

The Solution

One preferred embodiment of the invention includes a new mechanism whereby a VoIP call server can detect Dual Tone Multi Frequency (DTMF) digit events within the bearer stream of a VoIP call session. A call server is defined as being an intermediate node on the signaling path of a call (e.g. a routing proxy) rather than an endpoint such as an Interactive Voice Response (IVR) system. This embodiment of the invention allows the call server to cost effectively provide mid-call services to end clients based on DTMF digit events originated by a client.

Figure 12:
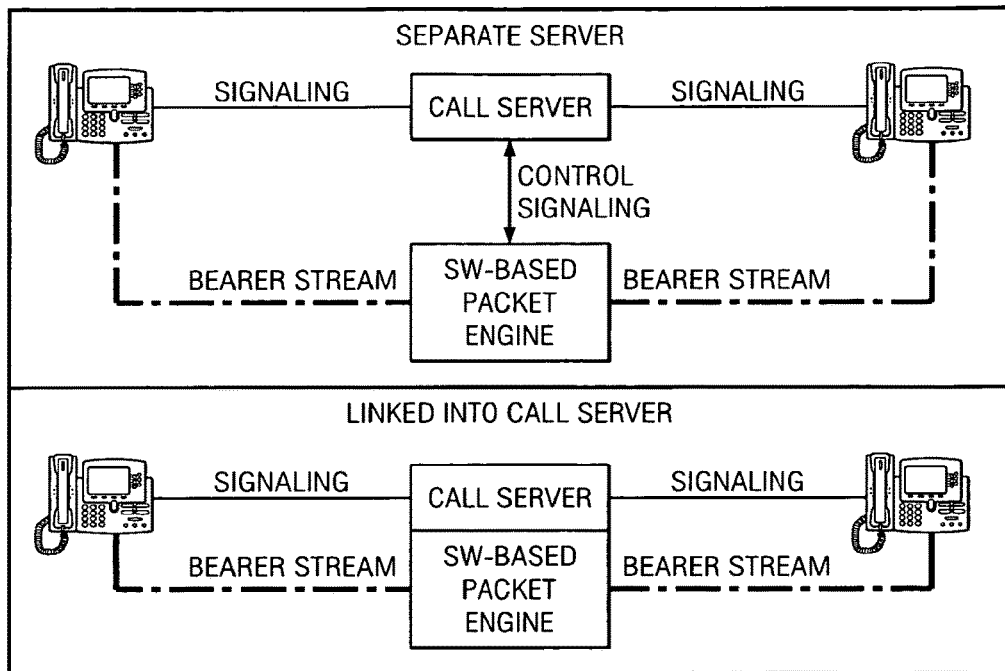
FIG. 12 depicts a Packet Engine according to another preferred embodiment of the present invention allowing a call server to detect DTMF digit events on the call path.

This preferred embodiment of the invention, herein as the Packet Engine and shown in FIG. 12, allows a call server to detect DTMF digit events on the call path of an active two party call session using a software only solution. This software only solution provides the requisite functionality in a cost-effective and scalable manner.

The Packet Engine can be advantageously deployed on a separate hardware platform from the call server, on the same hardware platform, or even statically linked into the call server process itself in order to provide both flexibility and scalability. The Packet Engine supports control by multiple call servers in the network. Likewise, a single call server can control multiple Packet Engines providing for a many-to-many relationship.

Figure 13:
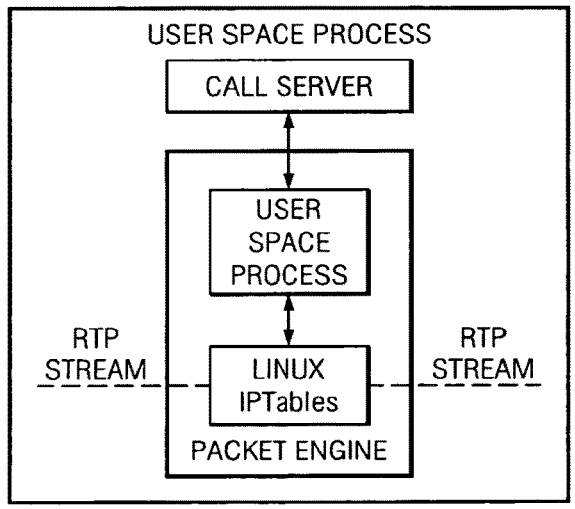
FIG. 13 depicts one embodiment of the Packet Engine consisting of a user space.
Figure 14:
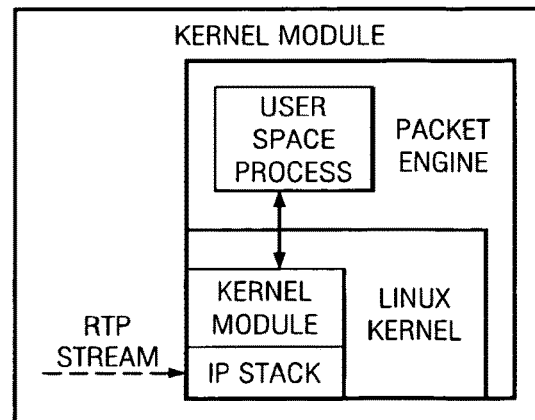
FIG. 14 depicts a Linux kernel module of the Packet Engine.

In one preferred embodiment, the Packet Engine consists of two parts: a user space process as shown in FIG. 13 and a Linux kernel module as shown in FIG. 14. The user space process is responsible for receiving and sending commands to/from the call server. The user space process utilizes the Linux utility IPTables to create port mappings within the IP stack. This advantageously allows RTP media packets to flow from one side of the Packet Engine to another in a highly efficient manner (all forwarding is done within the stack preventing packets from being sent up to the user space process).

The second part of the Packet Engine, the kernel module, allows the Packet Engine to determine which packets being forwarded by the IP stack contain DTMF digits. The kernel module examines the headers of each RTP packet being forwarded and checks the Payload Type field. If the Payload Type field indicates the packet contains a DTMF event (encoded as per IETF RFC 2833) then the kernel module sends the packet up to the user space process for further application level processing. The kernel module advantageously operates as an extension (plugin) to the Linux kernel and therefore allows incoming packets to be examined in a highly efficient manner since the packet never leaves the kernel.

Once in the user space, the DTMF events are reported up to the call server in order to enable feature invocation. The Packet Engine can be supervised by the call server to only look for specific DTMF digit patterns and report them to the call server or it can be supervised to look for and report all DTMF digit events. The Packet Engine utilizes a buffer and an inter-digit timer to determine the start and stop of digit patterns (e.g. *97) in order to differentiate a feature invocation digit pattern from standard DTMF digits being sent to end client application such as an IVR.

The invention also advantageously provides a network-based architecture that enables the support for existing standard cellular handsets, without modifications or client software on the devices. Next generation specialized Wi-Fi and client-based handsets are also supported. By comparison, alternative solutions may require specific expensive specialized handsets with downloadable software clients that need to be managed by the enterprise IT department. The usability of these services is often not as intuitive and simple as using the standard phone capability for making calls, since the software is downloaded onto the device and subject to the device's capabilities and restrictions such as window screen size and soft & hard key programming. In addition, because the client is itself is an application running on the device, the client has to be activated, or 'turned-on' to run the application to integrate with the enterprise network. This means it may be possible that the employee chooses not to activate the feature, and thereby continue to make calls on the cellular network that are not tracked, managed, monitored or routed over the corporate network (for least cost routing) by the enterprise's PBX.

Because the described solution is network-based, the employee cannot circumvent the enterprise integration. At the discretion of the enterprise, employees may be permitted to use the cellular phone for personal use, for example on weekends or after work, by tracking these calls and charging them to the employee or deducting directly from their paycheck. The cost of the personal calls may still be at the corporate discounted rates which would thereby benefit the employee.

IMS Architecture

Figure 10:
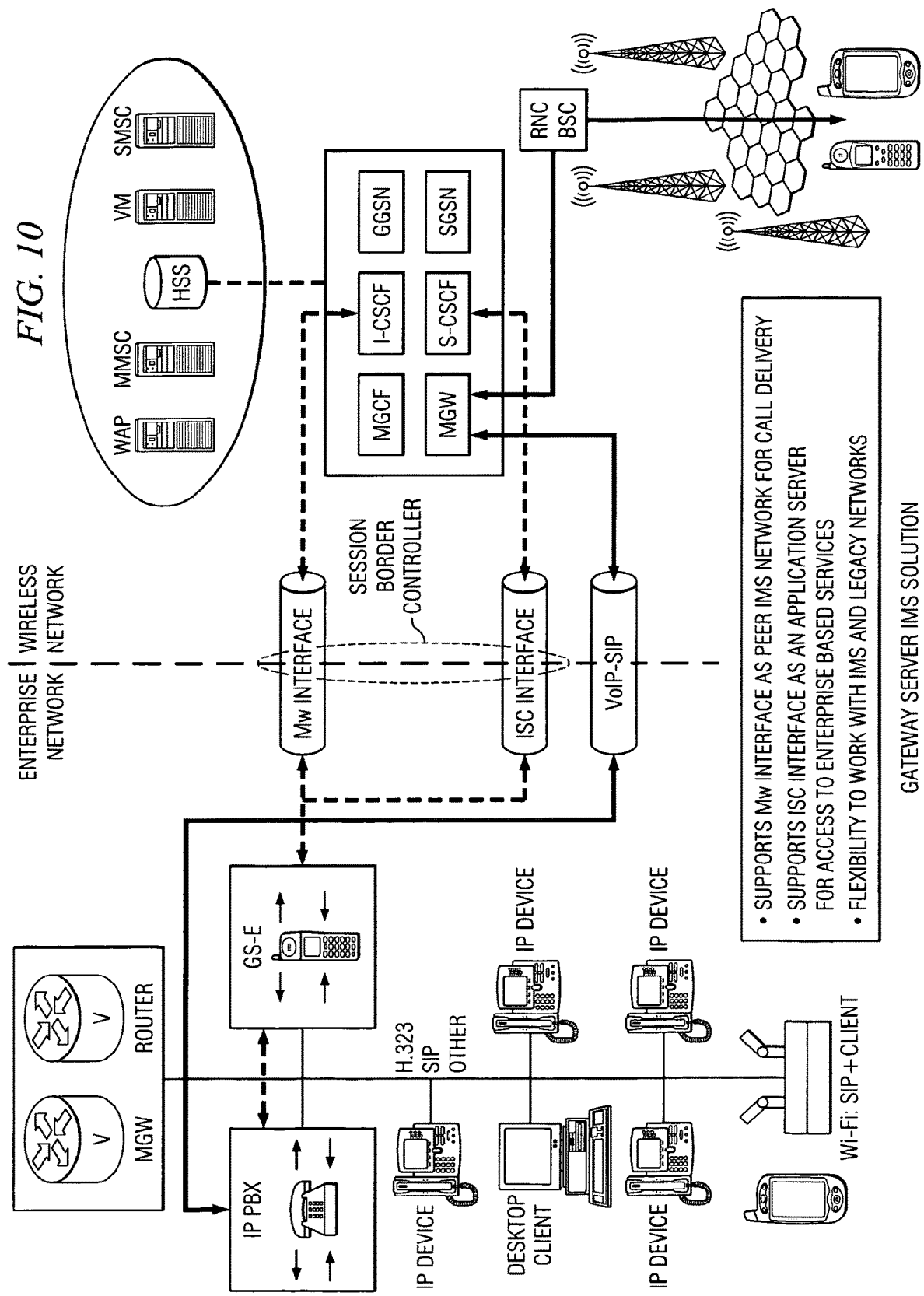
FIG. 10 is a diagram of a next generation IMS architecture that is backwards compatible with legacy cellular networks based on existing cellular protocols.

The gateway server 10 is based on the next generation IMS (IP Multimedia Subsystem) architecture as shown in FIG. 10, and is designed to be backward compatible with legacy cellular networks based on existing cellular protocols. This feature enables the gateway server 10 to be futureproof as operators roll out an IMS architecture over time, while still supporting the overwhelming majority of existing legacy networks and devices that do not support IMS.

Figure 11:
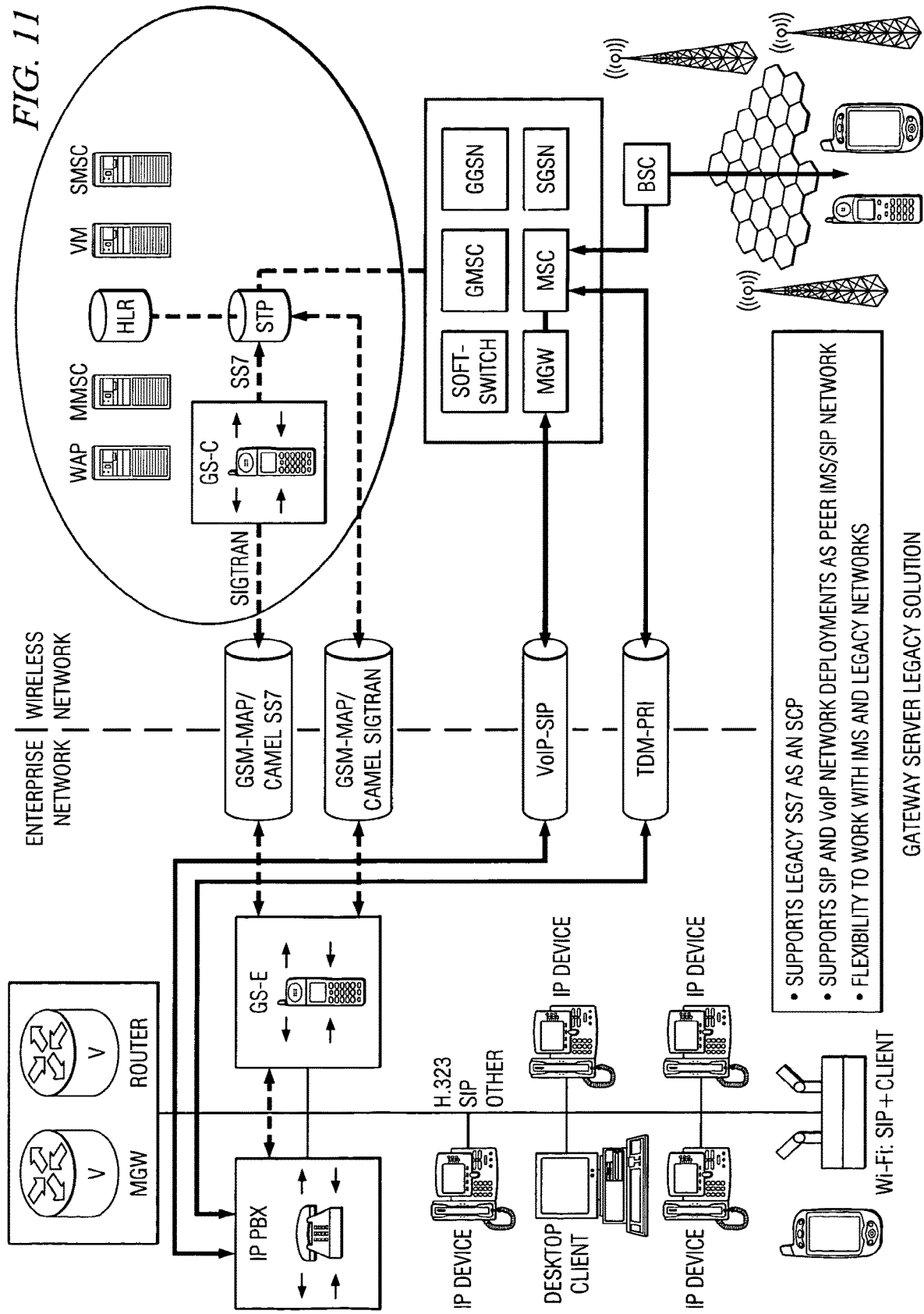
FIG. 11 is a diagram of a conventional legacy network architecture that does not support IM.

Current competing solutions are designed using legacy network architecture only, with no support for IMS. Effectively, the gateway server IMS solution adds modules for supporting ANSI-41/WIN and GSM-MAP/CAMEL and AIN protocols to achieve backward compatibility with legacy networks, as shown in FIG. 11.

Legend

BSC: Base Station Controller—Component of a cellular network that connects between the MSC and the Base Station Transceivers that communicate with mobile devices over the air CAMEL: Customised Applications for Mobile networks Enhanced Logic A set of GSM standards designed to allow an operator to define services over and above standard GSM services based on the Intelligent Network (IN) standards, and uses the CAP protocol.

CAP: CAMEL Application Part—Protocol stack that provides service control for voice & data services and IP multimedia sessions CCCF: Call Continuity Control Function—Signaling function for ensuring voice call continuity across disparate networks such as from cellular to Wi-Fi networks IM-SSF: IP Multimedia Service Switching Function—Interfaces with CAMEL Application Servers using CAP MGCF: Media gateway Control Function—Signaling controller of Media gateways using SIP MGW: Media gateway—Component of a communications network that converts between different media types (e.g. VoIP and TDM voice) for delivering bearer traffic.

MMSC: Multimedia Messaging System—A system of transmitting various kinds of multimedia contents (e.g. images, audio &/or video clips) over wireless networks using the Wireless Application Protocol (WAP) protocol.

NeDS: Network Domain Selection—Signaling function that controls selection of different access networks for delivering calls P-CSCF: Proxy Call Session Control Function—The SIP proxy server that is the first point of contact for a terminal with the IMS network SCP: Service Control Point—A standard component of IN (Intelligent Networks) used to execute and control IN services S-CSCF: Serving Call Session Control Function—The central IMS SIP server of the signaling plane for controlling sessions SIP: Session Initiation Protocol—A protocol developed by the IETF for initiating, modifying, and terminating an interactive user session that involves multimedia elements such as video, voice, instant messaging. In November 2000, SIP was accepted as a signaling protocol of the IMS architecture. It is one of the leading signaling protocols for Voice over IP, along with H.323.

SIP-AS: SIP Application Server—IMS element for invoking and controlling services SMSC: Short Message Service Center—Application for enabling the transmission and reception of text messages on mobile phones VM: Voicemail—Application for recording and retrieving voice messages WAP: Wireless Application Protocol (WAP)—Open standard for Internet access from a mobile phone.

WIN: Wireless Intelligent Network—Signaling standard designed to allow an operator to define services over and above standard ANSI-41 services based on the Intelligent Network (IN) standards The invention also advantageously provides a network-based architecture that enables the support for existing standard cellular handsets, without modifications or client software on the devices. Next generation specialized Wi-Fi and client-based handsets are also supported. By comparison, alternative solutions may require specific expensive specialized handsets with downloadable software clients that need to be managed by the enterprise IT department. The usability of these services is often not as intuitive and simple as using the standard phone capability for making calls, since the software is downloaded onto the device and subject to the device's capabilities and restrictions such as window screen size and soft & hard key programming. In addition, because the client is itself is an application running on the device, the client has to be activated, or 'turned-on' to run the application to integrate with the enterprise network. This means it may be possible that the employee chooses not to activate the feature, and thereby continue to make calls on the cellular network that are not tracked, managed, monitored or routed over the corporate network (for least cost routing) by the enterprise's PBX.

Because the described solution is network-based, the employee cannot circumvent the enterprise integration. At the discretion of the enterprise, employees may be permitted to use the cellular phone for personal use, for example on weekends or after work, by tracking these calls and charging them to the employee or deducting directly from their paycheck. The cost of the personal calls may still be at the corporate discounted rates which would thereby benefit the employee.

System and Method for Executing Originating Services in a Terminating Network for IMS and Non-IMS Applications The invention describes a system and method for executing originating services in a terminating IP Multimedia Subsystem (IMS) network in which a triggered application may or may not support IMS.

One of the benefits of such an invention is to enable an IMS network to interface with a non-IMS network. Another benefit is to enable an IMS network to interface with a second IMS network supporting a non-IMS application. A third benefit is that an originating IMS network need not have to support all originating services for the originator as the invention enables a second network to offer originating services for an originator in a first network.

A Gateway Server acting as an IMS standard-compliant SIP Application Server in a first IMS network can communicate with a corresponding GS in the terminating network to enable origination services to be executed in the terminating network even if the terminating network is not IMS-compliant. The GS-C is typically located in the wireless carrier network which may be IMS-compliant, while the GS-E is typically located in the enterprise network which may or may not be IMS-compliant. This application server in the enterprise could be a PBX which effectively serves subscribers in a manner similar to an IMS Serving-CSCF, however does not support IMS interfaces.

Irrespective of whether the terminating network is IMS-compliant or not, the described architecture in which a GS is acting as an IMS-compliant SIP-AS within the IMS network interfacing with a GS in another network enables this second network to offer origination services separately from the first network.

For this to occur, the session, when passed to the GS-C application server, is redirected into the terminating network, which could be an enterprise. This is performed by resetting the destination address to an enterprise specific address and instructing the wireless network route that session into the foreign domain of the enterprise network. GS-C may communicate with the GSE directly outside the IMS network, or through the stand IMS network messaging.

To enable the execution of originating services within the terminating network, the GS solution enables the enterprise network to provide those services by passing the session to a PBX as if it were a request for originating services. Therefore two types of originating services can be executed—those in the wireless carrier network (the originating network) and those of the enterprise (the terminating network).

In a similar manner, termination services are executed in the terminating network. When a session is terminated to an enterprise user, the GS solution enables the PBX to execute its terminating services for that user, and then pass the session to the IMS network as a termination such that the terminating wireless carrier may also apply terminating services for the terminating mobile subscriber.

Figure 15:
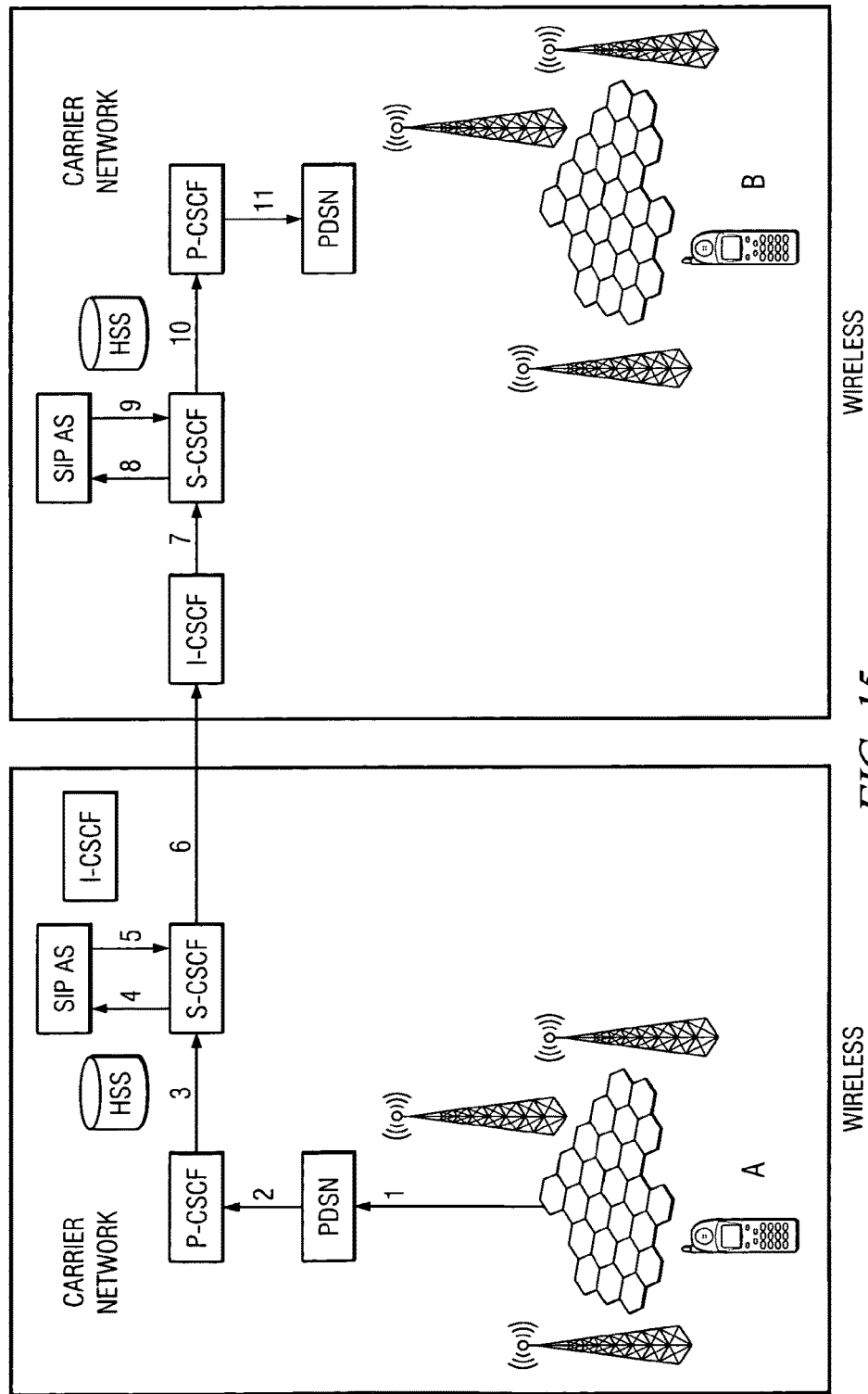
FIG. 15 depicts the current IMS standard definition.

FIG. 15 outlines the current IMS standard definition in which an IMS device A originating a session with the carrier IMS network communicates with the data gateway (1) which forward to the P-CSCF (2) which ultimately communicates with the Serving-CSCF (3). The S-CSCF triggers on the Initial Filter Criteria (IFC) to one or many SIP-AS which perform the origination services for user A prior to routing the session (6) to the destination in the terminating carrier IMS network through the I-CSCF to user B's S-CSCF (7).

The S-CSCF then triggers on the IFC to one or many SIP-AS which perform the terminating services for User B (8)-(9) prior to terminating the session through the data gateway (11) to user B.

Figure 16:
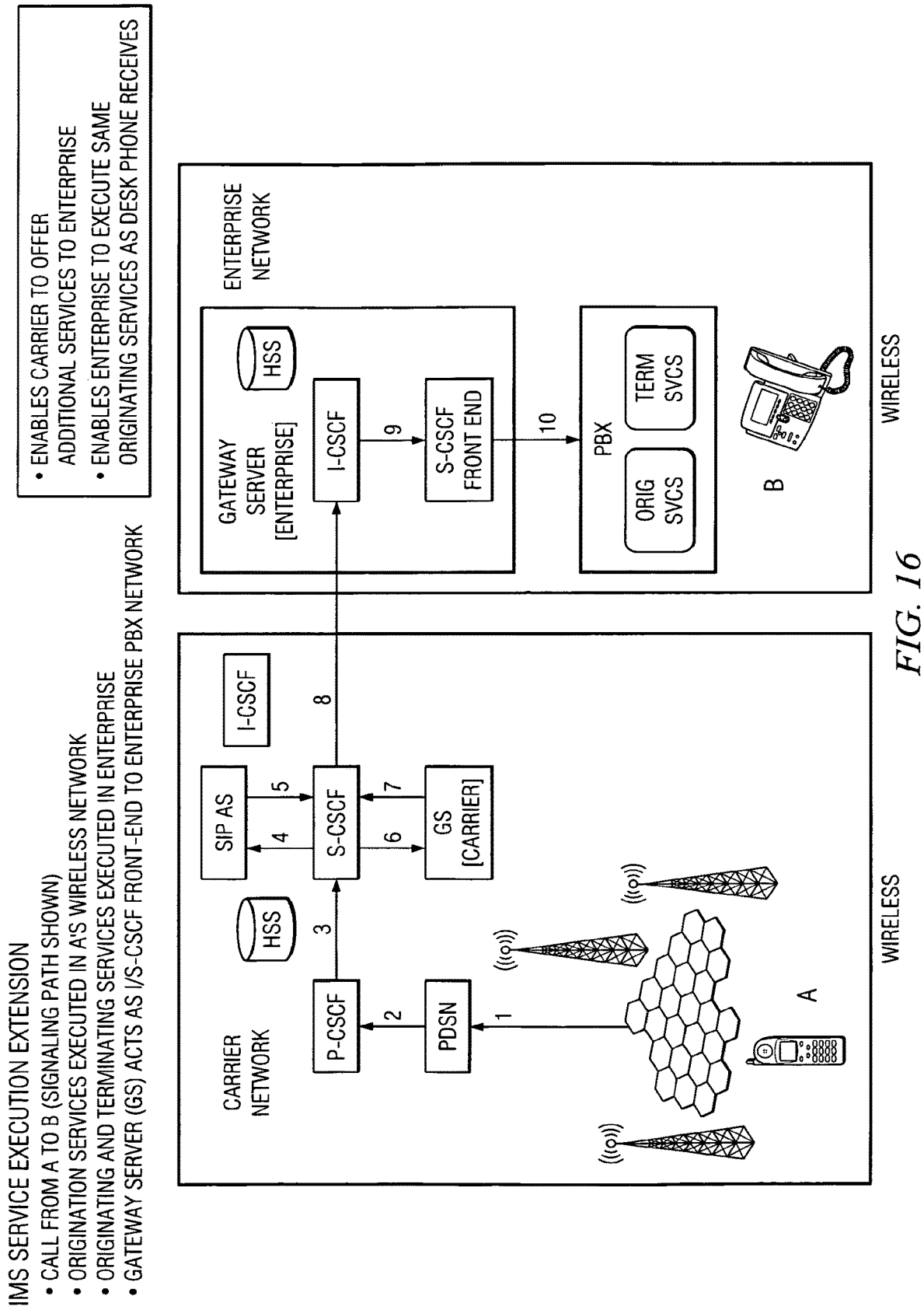
FIG. 16 depicts one exemplary embodiment of the invention for IMS service.

FIG. 16 outlines the invention whereby the steps 1 through 5 are the same as previously described, whereby the GS-C represents a SIP-AS that is triggered by the IFC. The GS-C may communicate with the GS-E directly (8) to prepare it for an upcoming communication (9), in which case the GS-C/E are treated as a complex by the originating network's S-CSCF. Alternatively the GS-C can communicate with the GS-E entity through the standard IMS interfaces (9). In either case, the S-CSCF then routes the session (9) to the destination in the terminating carrier IMS network through the I-CSCF as part of the GS-E, to user B's S-CSCF (10), which may act as a front-end converted to a non-IMS application such as a PBX. In this case the S-CSCF Front End (FE) converts the IMS messaging into the corresponding SIP-AS service-invocation messages of the non-IMS application (11).

The FE may convert the terminating services request to an originating services request prior to communicating with the terminating service (11). This allows the terminating service to invoke services as if it were an originating node. For example, the PBX can perform originating services such as invoking call policy (restrict user A from dialing international) prior to routing the call.

Once the originating services are executed, the non-IMS application can then perform terminating services. For example, the PBX could invoke destination services for user B to route calls from user A to voicemail.

In the case where the terminating network application were IMS-compliant (e.g. an IMS-compliant PBX), the FE would convert the terminating services request to an originating services request prior to communicating with the IMS-compliant application (11), and once the originating service has been performed, the application would return control to the FE which would then invoke another service request back to the IMS-compliant application to perform terminating services.

System and Method for Enabling Multi-Line Mobile Telephone Service on a Single-Line Mobile Telephone Another embodiment of the invention includes a system and method for enabling a multi-line mobile telephone service using a single-line mobile telephone. The embodiment of invention applies to various network architectures used in communications systems including legacy mobile network architecture based on SS7, GSM-MAP and/or ANSI-41, as well as the next generation IP Multimedia Subsystem (IMS) network architecture.

One of the benefits of this embodiment is enabling a subscriber to manipulate the outgoing caller identification information when originating a call, such that the called party will see the identity (including the phone number and name information) that was selected by the calling party.

An example of this embodiment of the usage of the invention might be a doctor whose patients are directed to call a special phone number to reach the doctor after hours. The doctor can set the special after-hours phone number to forward to their mobile phone using existing solutions that exist today. This way the doctor need not give out their personal mobile phone information. When a patient calls the special after-hours phone number, the call is forwarded to the doctor's mobile phone without revealing the doctor's mobile phone number to the patient.

However in the reverse case, this embodiment of the invention enables the doctor to call a patient from their mobile phone without revealing their mobile phone number. This is done by enabling the doctor to select a specific outgoing line from which to originate the call on their mobile phone. The patient will see the calling party identification information of the outgoing line selected by the doctor, which could be the special after-hours phone number, not be the doctor's mobile phone number.

The function of this embodiment of the invention is described below. This feature can operate in a legacy mobile network architecture such as GSM-MAP or ANSI-41, or in a next generation architecture such as IMS.

Outgoing Call Handling

Prior to originating an outgoing call the calling party can identify the outgoing line information using various means such as:

On a per-call basis, dialing a prefix to the outgoing number such as #542 or *542 (where 54 are the digits that represent the letters LI on a telephone keypad) indicating to use Line 2. Thus the digit string might be *542-212-481-2813 <SEND>

On a permanent calling basis, dialing a feature-activation code such as #542 or *542 indicating to use Line 2 for all outgoing calls until a subsequent instruction is received. The digit string might be *542 <SEND>. The subscriber can then dial any outgoing call such as 212-481-2813, and the call will be originated from Line 2.

Figure 17:
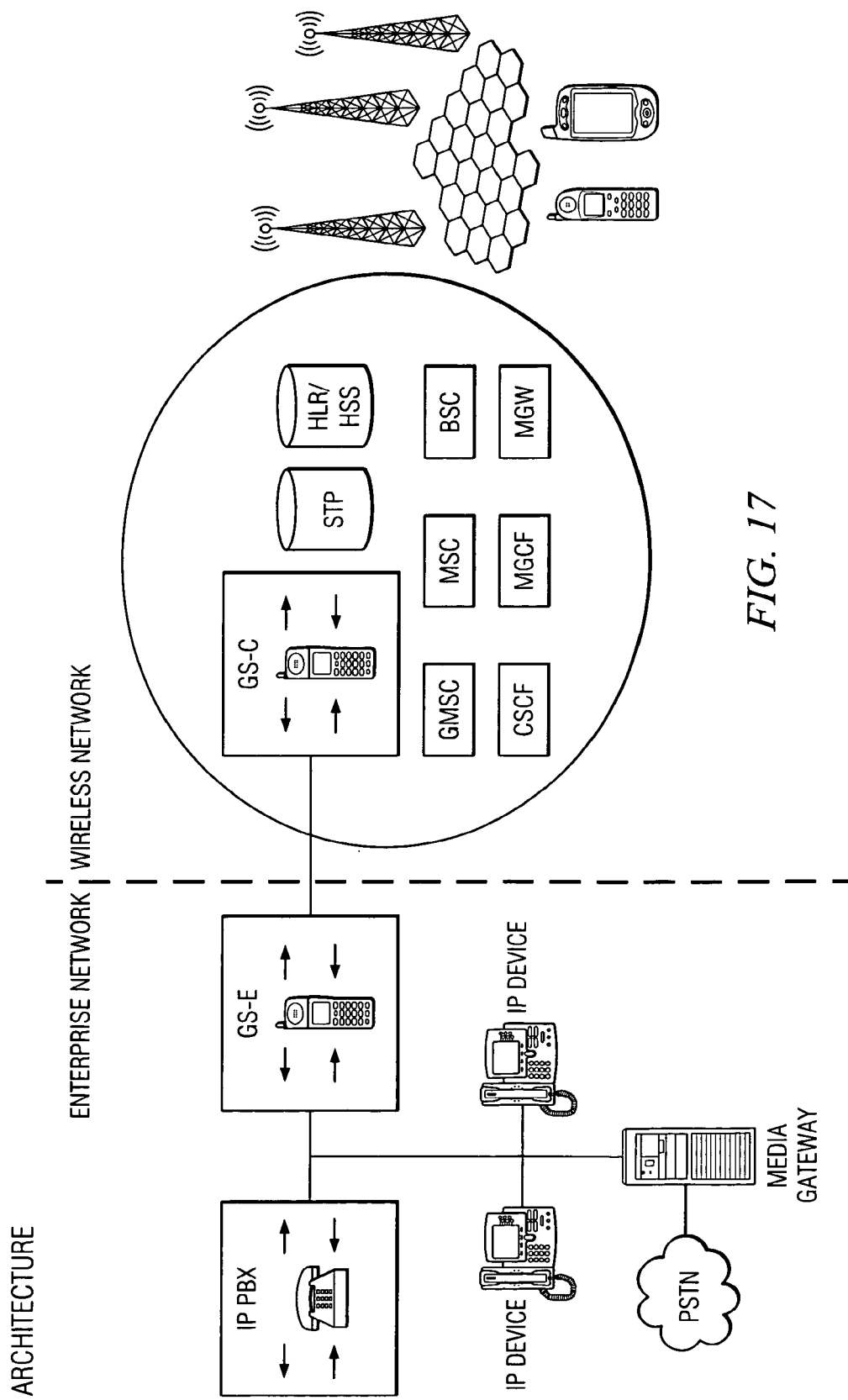
FIG. 17 and FIG. 18 depict a gateway server carrier (GS-C) configured as an IMS standard-compliant SIP, and associated algorithm.
Figure 18:
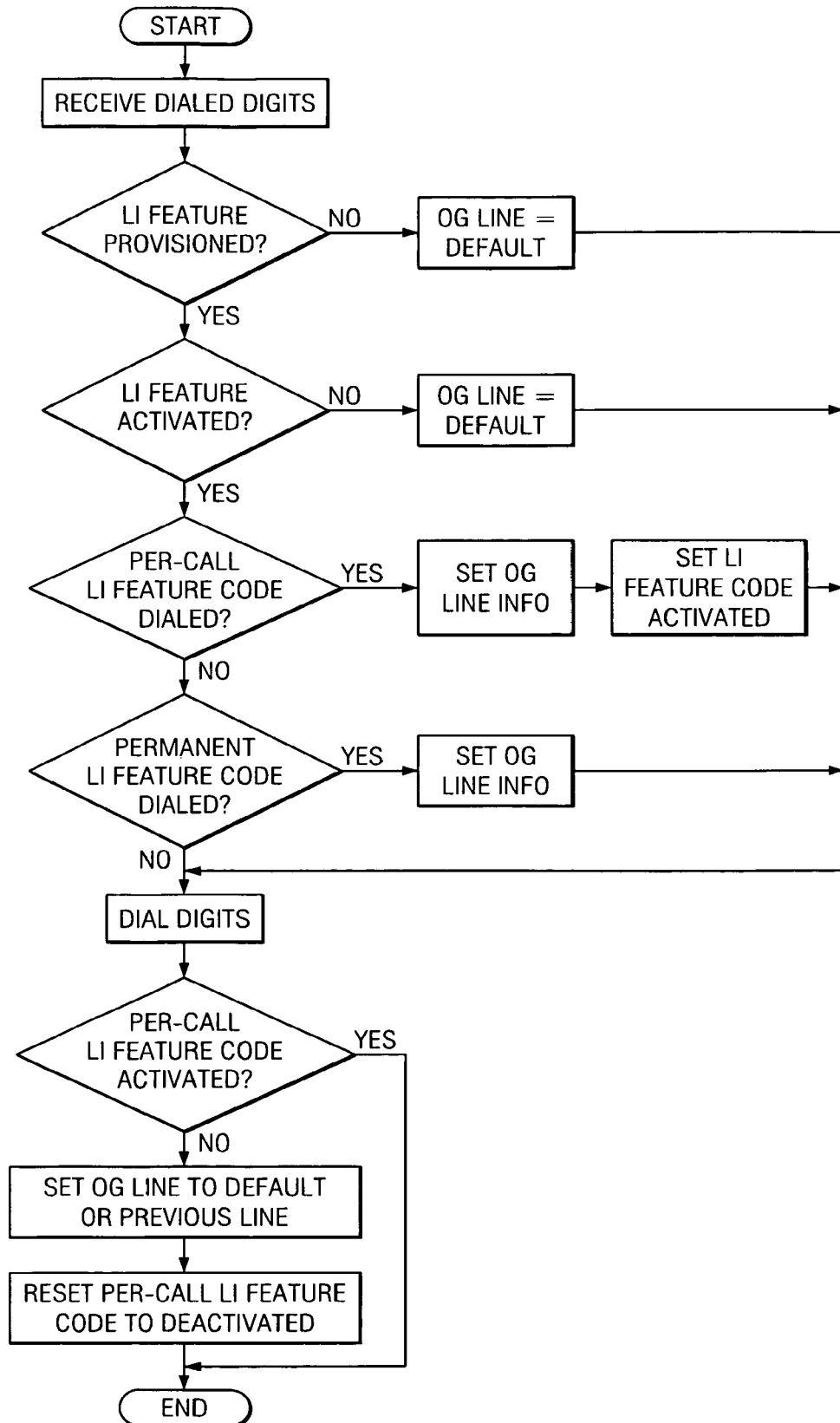

Referring to FIG. 17 and FIG. 18, to enable this capability, a Gateway Server Carrier (GS-C) acting as an IMS standard-compliant SIP Application Server in an IMS network architecture, or acting as an SCP (Service Control Point) in a legacy network architecture, will be triggered by the network to invoke a service. In the IMS case this trigger typically results from the Initial Filter Criteria (IFC) that is derived from the subscriber's Home Subscriber Server (HSS) profile and utilized by the Call State Control Function (CSCF). In the legacy case this trigger results from an intelligent network trigger that is originated from the Mobile Switching Center (MSC) based on the subscriber's Home Location Register (HLR) profile.

Once the trigger is received in the GS-C containing the digits dialed by the subscriber, the GS-C can then invoke the service whereby it can communicate with a Gateway Server Enterprise (GS-E) located in an enterprise. The GS-E can then originate an outgoing call to the intended destination using the outgoing line including the appropriate calling line information selected by the subscriber, and then connect that outgoing call leg to the originating call leg from the subscriber.

In the case of a per-call invocation of the multi-line service, subsequent calls made from the mobile phone would have the line selection default back to either a primary line, or to the last line selected in a previous call. For example, if a user's primary line is 212-814-4490, and they originate a call with digits *542-212-481-2813 indicating to use line 2 to call to destination 212-481-2813, then if the same subscriber subsequently dials another number such as 212-777-2222, this call would originate from either the primary line 212-8144-490 or from the previously selected line 2 from the previous per-call invocation of *542-212-481-2813. Thus the called party (212-777-2222) would see the calling party information as either the primary line 212-814-4490, or the previously per-call selected line 212-481-2813. The preference of whether subsequent calls should default back to the primary line or to the last line selected in a previous call can be defined by either the service provider, the system administrator or the user if permitted.

In the case of a permanent invocation of the multi-line service, all subsequent calls to the feature invocation (i.e. following the dialing of *542 indicating the selection of line 2), would continue to use line 2 until changed by the user, the system administrator or a function such as a timer or external application. For example, a calendar event could automatically reset a doctor's outgoing mobile phone line back to the daytime office number beginning each morning.

Additionally, a user may select a personality or profile based on various criteria (such as the user being at work, in a meeting, at home outside of work hours, etc.). The personality or profile can be selected manually or automatically set based on criteria such as whether the employee has badged into the office or has logged into their work computer, Time-of-Day or Day-of-Week information, or other criteria. The personality or profile would determine the outgoing line to be used—such as a personal line when after six in the evening, or when the user has badged out of the office or has logged out of their work computer. Additionally the personality or profile could determine which voicemail system to use, in addition to the customizing and tailoring of other services.

Incoming Call Handling

Figure 19:
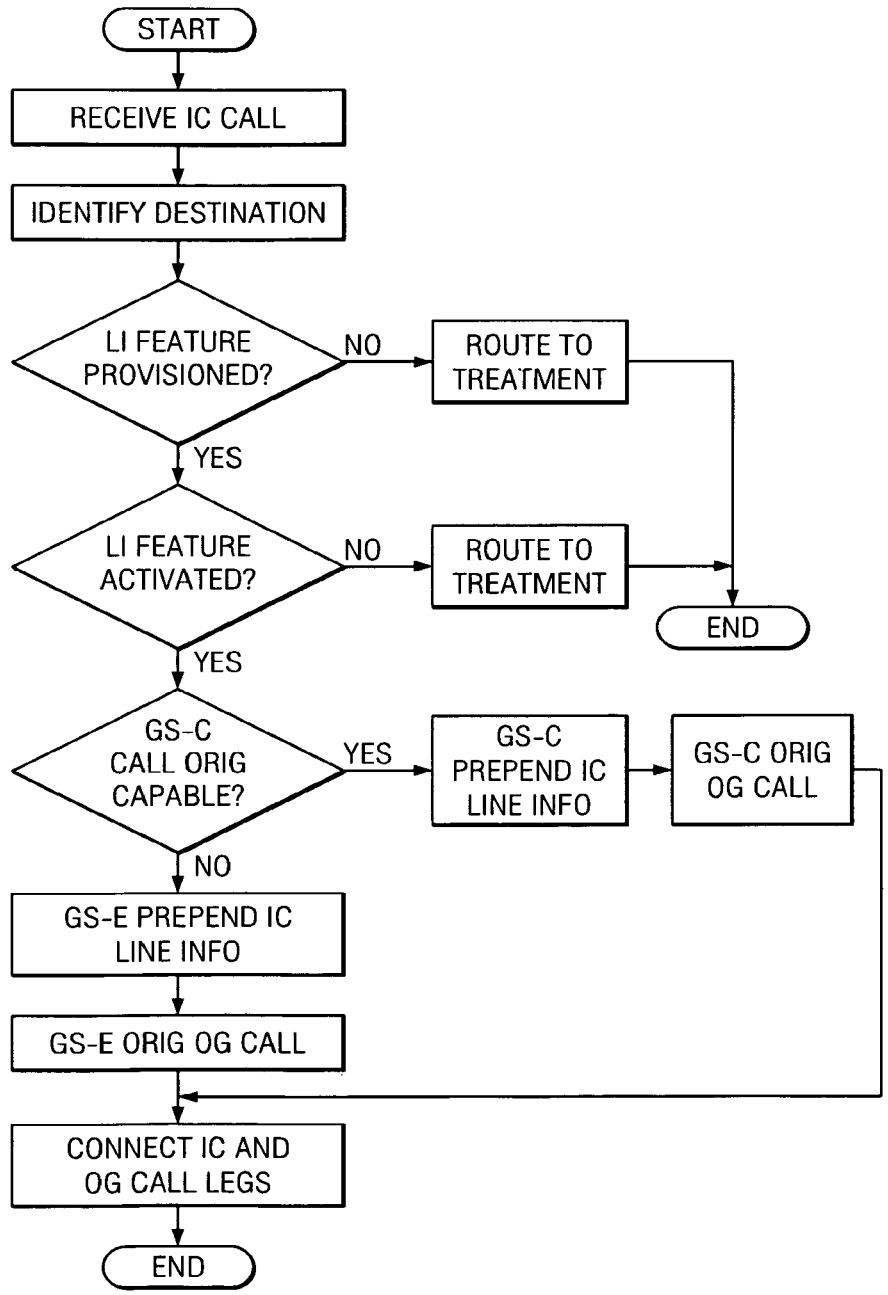
FIG. 19 depicts an algorithm for receiving incoming calls on various lines that are to be directed to a subscribers mobile phone.

Referring now to FIG. 19, for incoming calls on various lines that are to be directed to the subscriber's mobile phone, the calling name and number information may be preceded with supplementary information to indicate which line was called. For example, an indicator such as 2# could precede the incoming calling name or calling number information to indicate the call came in on line 2. Simultaneously or alternatively a distinctive ring can be invoked instead of the standard ring, to indicate which line was dialed by the calling party.

Note in some cases replacing the first set of digits (such as the area code digits) with the line information may be preferred instead of prefixing the line information to the full digits in order to preserve the display formatting on certain mobile phones. This is because certain mobile phones support only ten digits in the display, therefore if line information is prefixed to the digits, the ending digits would not appear in the display.

Incoming calls on various lines that are intended to be routed to the subscriber's mobile phone terminate at the GS-E. The GS-E identifies the destination mobile phone to which the incoming call should be routed based on various criteria such as time-of-day, day-of-week, permanent settings, or other user/administrator settings for determining call routing.

If the GS-C has the ability to originate outgoing calls then the GS-E orders the GS-C to originate a call to the subscriber's mobile phone with the calling name and number information of the calling party prefixed with supplementary information to indicate which line was called, and/or with a distinctive ring indicator. Once the outgoing leg is established, the GS-C connects the outgoing leg to the incoming call leg in the control of the GS-E.

If the GS-C does not have the ability to originate calls then the GS-E originates the outgoing call to the subscriber's mobile phone with the calling name and number information of the calling party prefixed with supplementary information to indicate which line was called, and/or with a distinctive ring indicator. Once the outgoing leg is established, the GS-E connects the outgoing leg to the incoming call leg.

Technical Advantages

1. Provisioning: The gateway server may also support a provisioning engine for provisioning the functions of the server itself, as well as provisioning external nodes including the enterprise PBX and the public carrier cellular network nodes. It may be possible that the gateway server provisioning engine (GSPE) front-end the entire PBX and be used to provision all data in the PBX. Alternatively the GSPE may be used to provision all functions in the PBX related to a cellular subscriber including their landline information, or it may be used to provision only the cellular portion of PBX subscriber information. In the cellular network, the GSPE may be used to provision the HLR/HSS of the carrier to modify existing service profiles for employees that are currently subscribers of the operator's network and are being transferred to the new service plan for enabling this service. The GSPE may also be used for provisioning new subscribers to the service that were previously not subscribers of that operator. The GSPE may also be used for provisioning other nodes in the cellular network such as a Foreign Agent, Home Agent, soft-switch, MSC, SGSN or GGSN. These functions would typically be provisioned with routing information used for enabling the service.

2. Method for speeding up call originations/terminations by using predictive techniques for routing half call, using intelligence to decide when to route calls to different devices based on presence, routes, TOD, distance. Calls routed to/from a subscriber of this service typically occurs in two stages, e.g. from the cellular network to the enterprise, and from the enterprise to the destination. Since the gateway server is notified in the first stage of the originator and the desired destination, it is possible for the GS to begin routing the second leg prior to the first leg's bearer being established. Using intelligence of the destination route combined with knowledge from past experience in the time it may take to route to a certain destination using a particular method or link, the GS may predict the moment at which it should begin routing the second leg of the call in anticipation of receiving the indication that the bearer for the first leg being established such that the two legs can be connected together with no delays. This technique can be used to minimize the chances that the second leg will be established and answered by the destination party before the first leg is setup. Conversely, this technique may minimize the wait of the originating party for the second leg to be established since the first leg need not be completely established to the enterprise before routing of the second leg is started. The GS may continuously update its information with intelligence about the routing times for specific destinations, and use this information in deciding the timing of setting up the call legs in order to minimize the end-to-end call establishment time.

3. Enterprise Call presence for mobile phones: Because the GS is located in the call path, the GS maintains knowledge of when a subscriber is active and available for calls, and also when a subscriber is currently in an active call. The GS can share this information with applications that may be used to, for example, indicate to other users that the subscriber is currently busy in a call. When the subscriber terminates the call, this information can be used to inform another user that the subscriber is available to receive a call. This presence information can also be provided to other presence servers that may be outside the enterprise site including with the carrier.

4. Enterprise HLR/HSS: The invention enables the distribution of HLR/HSS subscriber information among multiple sites within the enterprise. For example, the HLR/HSS information may be distributed according to the various PBXs in the enterprise network such that cellular information is stored at the site where the subscriber has a PBX subscription. The location of this information within the enterprise can be hidden from an outside entity such as the public carrier network such that an outside entity need not have to know where it is stored in order to access it. Any point of entry to the enterprise network may be able to locate the information of a particular subscriber.

5. Data—VPN-less session setup for enterprise. The invention enables a GGSN or HA to be including in the GS in the enterprise such that a secure data session can be established automatically between a device on the cellular network and the enterprise network by establishing a GTP tunnel between the carrier-hosted SGSN and the enterprise-hosted GGSN. In addition, in the case where there is a GS-C located in the carrier network that interfaces with GS-Es in the enterprise network, it is possible for the invention to add additional security and encryption specific to the enterprise's needs between the carrier's network and the enterprise. In this configuration, the function of the GGSN can be split between the GS-C and the GS-E such that the carrier network interfaces with the GS-C hosted within the carrier site, while the GTP tunnel and secure encrypted data session can be drawn out to the GS-E hosted within the enterprise. All data traffic to/from the mobile device will traverse the enterprise and its associated secure firewall. Billing for the wireless carrier can be supported within the carrier's network via charging records being generated from the GS-C. Enterprise charging records can equally be generated within the enterprise from the GS-E in order to enable the enterprise to keep track of usage and be able to compare with service bills from the carrier received at the end of a billing cycle.

6. Alternative methods for handling call originations: Using SMS and Hotline for call originations: Alternative solutions can be used in place of Intelligent Network triggers such as WIN or CAMEL for communicating with an SCP function in the enterprise. One technique is to use a method such as Short Message Service (SMS) to send the origination information from a mobile to an application server in the enterprise, and then to enable a "hotline" feature in the subscriber profile that forces the mobile to route to a specified destination no matter what is dialed. The hotline feature is often used to route to customer service when a new phone is being setup. In this case the hotline feature would route all calls to a destination that would ultimately route into the enterprise network, either using VoIP or PSTN. By sending the origination information including the originating subscriber number and the destination digits to the application server in advance of the hotline call, this information can be used to identify the incoming hotline call, and re-route it to the desired destination. In order to be able to use SMS in this manner, it may be required to have a special client on the device that captures the digits and sends them in an SMS to a specific server. Alternatively this functionality could be built into the device natively thus not requiring a software client. Note in this case that the destination SMSC may also be the GS instead of the carrier's SMSC since it is important that this information be delivered in real time, and not delayed through store-and-forward in the carrier's SMSC. Otherwise the routing of the call could be delayed.

An alternative routing method does not require the hotline feature to be activated. Instead, when the SMS message is received at the application server, the application server can originate calls to the destination and to the originator's device. The originator would answer the phone and be connected with the second leg. If a client is on the device, the client may automatically answer the incoming call from the application server without ringing so as to appear as if the call was established by the originator's device when the SMS was sent. Other methods other than SMS for delivering the origination message may be used such as over-the-air messages and/or Unstructured Supplementary Service Data (USSD). Another alternative provides that originating calls are routed based on the subscriber profile to specific routes or trunk groups within the MSC. The destination routes to the GS which captures the original calling and called party information. The GS can analyze the routes and re-route the call accordingly, for example into the enterprise using VoIP.

This solution also enables the GS to manipulate call legs to be able to perform handovers (or handoffs) between, for example, a wi-fi network and a cellular network by enabling the GS to establish a new call leg for a call in progress and join or switch the failing call leg to the new leg. Similarly this kind of call leg manipulation can be used to maintain or reconnect a call that has been lost—for example if a subscriber enters a tunnel where there is no cellular coverage and therefore the call leg is lost, the GS can decide to maintain the other call leg up and potentially treat the leg by playing a message to inform the party that the call is being reconnected. The GS can then proceed to re-establish the call leg by establishing an outbound call to the device once they exit the tunnel, or having the device originate a call back to the GS if the device has a software client—and then the GS can reconnect the legs together, or the user manually originates a call back to the GS.

7. The combining of cellular nodal functions in a single functional entity: GMSC, GGSN, SCP, IMS SIP Application Server, Call Server. The invention combines the functionality of multiple cellular network nodes into a single entity that is scaled down to support in the order of thousands of subscribers compared with individual cellular nodes supporting millions of subscribers. The invention supports a GMSC for enabling call originations to an enterprise number to be redirected to a cellular phone number and routed using least cost routing techniques whereby the GS discovers the location of the terminating subscriber and can route the call to that serving MSC over alternate routes such as a public or private VoIP network. This reduces or eliminates transport costs to the public carrier since the call is routed over lower cost routes using VoIP, or completely outside the carrier's network. The interconnection to the carrier's network can be using VoIP which avoids any PSTN interconnect charges. The SCP function enables originating and terminating calls to be routed according to instructions from the enterprise in the GS which interacts with the enterprise PBX system Similarly this is achieved with the IMS SIP Application server function in the case of an IMS network architecture. The Call Server enables the carrier to route calls to and from their network using a distributed soft-switch and media gateway architecture that enables the bearer to be transmitted over VoIP instead of traditional trunks. Thus the carrier can route calls into and out of the enterprise over VoIP thereby avoiding PSTN interconnection and associated charges. The GGSN function onboard the GS enables the enterprise to route data sessions in a similar manner to how the invention describes the routing of voice calls. By including a GGSN function within the enterprise and connected with the cellular carrier's SGSN, a secure tunnel can be established between the carrier and the enterprise networks. Similarly this can be achieved with a Home Agent function located within the enterprise and connected with the carrier's Foreign Agent for CDMA networks. As such, the invention:

i. Eliminates the need for VPN software to be launched on the mobile device
  ii. Subjects the mobile device to enterprise data policy including security and firewalls no matter where the device is located, and without the need for user interaction-all data sessions are routed through the enterprise's corporate network and firewalls
  iii. Enables software applications to be embedded in wireless devices that can be launched remotely to, for example, destroy data on the device should the unit be lost or stolen—e.g. Poison Pills 8. Least cost routing for mobile originations to bypass long distance in control of enterprise: The invention describes how to bypass long distance for cellular subscribers for both international and national long distance, by routing the calls from the serving MSC into the closest point of entry into the enterprise network. This connection can be using traditional trunks which incur costs but is reduced since the call may be routed from the serving MSC to a local point of attachment to the enterprise network, or the connection can be using VoIP from the carrier network to the enterprise, which avoids any PSTN interconnect charges and also enables the call to be considered a local call even if the closest point of attachment is not local—the cost is according to VoIP tariffing which may include free nationwide as well as to Canada, western Europe and parts of Latin America.

The invention also describes the concept of Tail-End-Hop-Off (TEHO). TEHO enables an employee dialing long distance to route the call as far as possible via least cost routing, and route the last leg from the least expensive point. For example, if an employee in the US dials a local telephone number in London, UK, the GS could detect this and decide to route the call from the US to the corporation's office in London, and from there initiate a local call to the destination. The invention would then enable all the legs of the call to be connected together. The end-to-end call would be routed from the originator in the cellular network into the enterprise network via a local connection, across the corporation's least cost routing (possibly VoIP) network to the London office, and connected with the local call from the London office to the final destination. The invention also stipulates that TEHO could be disallowed based on various criteria, such as destination (e.g. if such a solution were not allowed for connecting to certain countries), Time of Day/Day of Week or other criteria such as subscriber profile or policies.

9. PBX feature transparency: The invention describes how to enable PBX services from a desk phone be executed on a standard cellular phone with no special clients. The GS is configurable specific to the enterprise. Therefore the feature codes used on a deskphone in a particular enterprise can be programmed to be the same or similar on the cellular phone. The GS enables the use of "7" or "9" to be dialed in order to get an outside line, just like on a PBX. On the cellular phone, the employee would dial 9 followed by the destination digits, followed by the TALK button. If the employee dials destination digits without a "7" or "9", the GS would consider them as internal PBX digits, such as a local 4 or 5-digit extension, or a 7-digit internal network destination. It is possible for the GS to suppress the use of "7" or "9" when using a cellular phone. The GS would analyze if the digits are internal or external and route accordingly. For example if the user dialed only 4 digits, the GS would treat as an internal extension. If the user dialed 10 digits, the GS would analyze the digits and if not associated with an internal extension, would consider it an external call and add the "7" or "9" prior to routing to the PBX. By enabling the suppression of the "7" or "9" for an outside line, the invention enables the employee to use the phone numbers stored in their device as they are—without modification.

An employee can select a person's name and which number they wish to connect with (office, home, cellular) in their directory in the phone and dial, and the GS will determine automatically if it is an external or internal number, and route accordingly.

Advanced PBX features such as Call Forward, Call Park, Call Pickup, Conference, Transfer, Do Not Disturb, Exclusive Hold, Consultative Hold, Last Number Redial, Link, Page, etc. that are available on the deskphone by pressing a "Feature" button followed by a code (e.g. Feature 74 to invoke Call Park, or Feature 85 to invoke Do Not Disturb), can be executed in a similar manner on the cellular phone by pressing an alternative button to "Feature" such as "*" or "#" followed by the same feature code. This is completely configurable and can be changed to suit the desire of the end user. If the user cannot recall what codes to use, the invention describes that the user can press a code such as "**", "##" or "4HELP" (44357) which would connect the user with an Interactive Voice Response System (IVR). The IVR would prompt the user with information such as "Press *74 for Call Park, Press *85 for Do Not Disturb". The user could enter the digits at anytime and the feature would be invoked. If the user remembers the code, they can avoid using the IVR on subsequent feature invocations.

The invention describes the invocation of features at the beginning of a call, and during a call. Mid-call triggers can be used by the system to inform the GS. For example if a user wishes to bridge in a third party, they could press TALK followed by the destination digits followed by TALK. A cellular system supporting mid-call triggers would send this information to the GS which would originate a call to the third party from the PBX, bridge the third part at the PBX, and enable the single voice path back to the cellular switch. The GS would respond to the midcall trigger with a message indicating to continue the call as normal. The result is that the original two parties would be connected with the third party through the PBX, and not through the cellular MSC—only a single voice path connection from the cellular MSC is required back to the PBX. Using the same concept, it is possible to link in multiple parties into a large conference call using the PBX and conference bridges in the enterprise, and only a single voice path connection to the cellular user.

If the cellular system does not support mid-call triggers, DTMF tones can be collected on the voice path using a code receiver placed in the voice path typically onboard a media gateway or subscribing to a media gateway for tone detection service. If a code receiver is used, it could be located in the enterprise, or at the carrier. As such, the user would not press the TALK button. Instead they would invoke features while in a call by pressing a designated code such as "*", "#", or alternatively "**" or "##" to invoke the IVR system to assist the user in invoking the services.

10. Monitoring and controlling of calls (voice and data) from enterprise mobiles. The invention previously described how all voice calls and data sessions from the cellular network are routed through the enterprise, enabling the enterprise to control, manage, subject to policy and even record the bearer information. The implications of this invention are consistent with what are considered "best practices" among corporations that must comply with regulations such as Sarbanes-Oxley for control procedures, similar to how corporations manage and control e-mail traffic or PBX voice communications that can be tracked and recorded.

While the invention enables an enterprise to gain control of voice and data calls, the design of invention also continues to enable federal legal requirements for monitoring calls on public cellular networks in compliance with regulations such as CALEA. Because the invention routes all calls through the serving MSC before they are routed to the enterprise, the serving MSC can still invoke wiretapping in accordance with federal law.

Similarly the invention design fully supports emergency call handling in that a subscriber that dials 911 will have the call immediately routed in accordance with emergency call handling procedures via the serving MSC which will override any triggers to route the call to the enterprise. As the invention uses standard cellular handsets, there E-911 location features operate as designed. Thus the architecture of the invention fully complies with emergency call handling regulations.

11. Identity manipulation for outgoing and incoming calls: The invention enables either the enterprise PBX landline phone number or the cellular phone number to be used as the single number. If the landline is used as primary and if the cellular number is called, the call can be allowed, or the call can be diverted to a voice recording that states the landline number to call. The call can then be routed, or it can hang up and require the originator to re-dial the new digits. Similarly this can be done with the cellular number as primary. If the landline is primary and the user originates a call from their cellular phone, the GS can manipulate the outgoing callerid information to be the landline number instead of the cellular number. If the terminator decides to call back the originator, they can select the callerid which will be the landline number. Similarly this can be done with the cellular number as the primary.

SMS message originations from the mobile user are triggered to the GS which converts the originator's cellular phone number to the landline number. The SMS can then be redirected back to the MSC for sending to the SMSC, or the GS can instruct the MSC to cancel the message, after which the GS originates a new SMS directly to the SMSC containing the landline origination number and the original destination. Similarly when an SMS is sent to a subscriber using their landline number, the MSC will trigger to the GS based on the terminating number. The GS will convert the destination number from the landline to the cellular number and return it to the MSC for routing to the subscriber or SMSC. In this case it may be required that the HLR be provisioned with a subscriber profile for the landline number to trigger to the GS. In the case where the GS also contains an SMSC on the SS7 network, the originating MSC would route the SMS to the GS-SMSC which would in turn convert the landline number to the cellular number and originate a new SMS to the cellular network for termination.

12. Enhanced services
  a. Notification of policy enforcements: The invention describes new control procedures for mobile devices based on policies from the enterprise. For example, the enterprise can restrict incoming and/or outgoing calls when an employee is outside work hours, is outside the building, has badged out of the facility and/or has logged out of their enterprise data network from their computer. Should the employee attempt to originate a call, the system can provide a dynamic treatment that might play a message to inform the employee of the policy that is preventing the call from proceeding. Similarly, it is possible for an incoming call to apply a dynamic treatment that might inform the calling party that the called party is no longer in the office, has badged out for the evening and/or has logged out of their enterprise data network from their computer. The call could then be routed to standard voicemail or other appropriate treatments.
  b. Using an Application Programming Interface (API) and/or Software Development Kit (SDK) on the GS, applications can be written to control voice calls and data sessions. For example, a time clock, badging system, or signaling from a computer login/logout can be used to activate/deactivate a mobile phone. Similarly this technique can be used to change the recording of calls to be from a corporate account to a personal account for charging purposes. For example when an employee logs off their computer, the cellular phone account is switched to a personal account and phone calls may be deducted from the employee's paycheck. In another example, the API/SDK can be used to assign a particular cellular phone to a particular user at a particular time. For example, an employee may be assigned a set of equipment at the start of a shift which might include a cellular phone. To activate the assigned cellular phone to the employee, the API/SDK can be used to associate the phone with the employee. The phone may contain the same cellular phone number, but the enterprise landline number would be assigned to route to that particular cellular number for a duration of time until the employee returns the device at the end of the shift.

13. Billing
  a. Enabling carrier to store a enterprise-specific billing ID in CDR: The invention describes the assigning of a billing identifier generated by either the GS or the cellular system that is shared between the GS and cellular network, and can be included in the Charging Data Records. The billing identifier can be used to correlate multiple generated CDRs associated with a common event.
  b. Use of Prepaid triggers to mark the start and end of calls: The invention describes the use of cellular Prepaid triggers to mark the start and end of calls, even if the call is routed entirely by the cellular network. For example if user A calls user B and the GS determines that both users are on the same cellular carrier, and do not need to be monitored, then the GS may instruct the MSC to proceed with routing the call from A to B. The start and end of the call can still be recorded by the GS based on prepaid triggers.

14. IMS-Legacy Interaction
  a. Policy: The invention enables the enterprise GS to apply policy rules to the carrier PDF in order to enable target service objectives for the subscriber for the portion of the service that is handled by the carrier network. Conversely the invention enables the carrier PDF to provide the GS with policy rules for the portion of the service that is handled by the enterprise network. If the enterprise is not capable of meeting the minimum policy requirements for the session, the carrier network may take alternative actions—e.g. route the call themselves, reject call, redirect to another service or gateway.
  b. IM-SSF: The invention enables the IM-SSF function to be expanded beyond CAMEL prepaid triggering to support legacy network interaction for establishing legacy services such as SMS and voice calls. For voice services, the IM-SSF can be used by a SIP-AS to signal to an MSC or HLR by converting SIP messages into, for example, ISUP, AIN, GSM MAP or CAMEL, and/or ANSI-41 or WIN. This could be used to execute a handoff procedure between an IP network such as VoIP with a cellular network (or vv), or to enable IMS applications to invoke legacy services such as a voice call to a device that does not have an IMS client and does not support VoIP.
  c. CSCF: In the case that a solution supports Wi-Fi for voice calls, the GS acts as a local P-CSCF in the enterprise that interconnects with the carrier I-CSCF and S-CSCF. The GS can also perform the functions of an I-CSCF as a peer to the carrier network for routing sessions within the enterprise, and an S-CSCF to service the device within the enterprise network. For the routing of emergency calls, the GS can manage whether the call is sent to the landline network, in which case it would provide landline emergency location information, or to the cellular network in which case cellular emergency call handling would be performed including location tracking. Additionally, if the device is in the enterprise and operating on the Wi-Fi network, the GS could alternatively perform cellular emergency call handling and act as a proxy for the device in order to be able to interact with the cellular network emergency call handling functionality. In this case the GS would support the location information transactions with the cellular network by providing location information of the enterprise to the cellular network. This could be statically stored information in the GS describing the general location of the enterprise, or specific areas within the enterprise—or could be dynamically obtained by the GS using various location techniques, for example based on Wi-Fi location such as AP connection, and converted to cellular-recognized location information. In this manner the cellular network would require no changes, while the device could be operating on an alternative network and still receive emergency service.

15. Configurations: The solution enables various configurations to be deployed.
   a. Pure enterprise call control in which the GS is located at the enterprise site. The GS interfaces with the cellular network nodes supporting SS7 and SIP or other messaging with the carrier network. The carrier network must be able to address the GS in order to send and receive messages.
   b. Split call control between carrier and enterprise in which the GS located at the enterprise interacts with a GS at the carrier. The connection between the GS-E and the GS-C can be SIP or other protocols. This configuration typically enables the carrier network to have a central point of control for interacting with multiple enterprises, and may not require the use of SS7 messaging to the enterprise—instead it is possible to have a secure IP connection supporting SIP. This is also useful for offering a Centrex solution for interconnecting with a carrier-hosted PBX, or for interconnecting a carrier-hosted GS with enterprise-hosted PBX systems. The GS-C supports an SS7 point code multiplexer in which only one or two point codes are needed to address all enterprises, since the GS-C can identify for which enterprise the message is intended. The GS-E is able to provision the GS-C automatically over the IP interface to manage subscribers, e.g. to add new pilot DNs for new subscribers. In this case the triggers used by the originating and terminating triggers used in the cellular network for routing the calls to the GS-C can add identifying information of the specific enterprise in the triggering messages (e.g. ORREQ). Alternatively the GS-C can identify the enterprise based on the calling party information.

16. Availability: PBX systems are by nature designed to be enterprise-grade, which implies they may go out of service more frequently than carrier systems which must comply with strict minimum downtime requirements. The architecture of the invention increases the effective availability of a PBX system for routing calls since the GS (GS-E or GS-C) can instruct the cellular network to route the call (with same or modified dialing instructions) in the event that the PBX has gone out of service. The GS can store the call information and report it to the PBX when it is back online. In the event that the GS should go out of service, the architecture of the invention enables the cellular network to be configured such that if its communication with the GS times out, the cellular network can take alternate action, for example to route the call on its own, send to treatment (e.g. play a message), redirect to an alternative GS, or other call handling.

17. MVNO infrastructure: The invention is effectively a wireless core network that could alternatively be packaged and sold to MVNOs to enable them to operate their own core networks and host their own advanced services, while connecting to public cellular carrier networks for radio access.

18. Call Leg Manipulation and handling—In addition to using originating and terminating triggers to transfer call control from the carrier network to the enterprise via the GS, the solution also enables advanced services to be executed mid-call using mid-call triggers or in-line code receivers. When a user wishes to invoke a mid-call service such to invoke a multi-party call using an external conference bridge that resides in the enterprise network, the user can press digits on the device to invoke the service, and then press the TALK or SEND button to invoke a flash. The flash message is sent to the GS using mid-call triggers with the information of what was dialed. The GS can then respond to proceed with the call as normal, so that the voice conversation can continue, and then the GS can invoke the service, in this case to bridge in other users to the call, from the enterprise side. Thus for a multi-party call, only one voice leg is required from the user to the enterprise. Alternatively to the use of mid-call triggers, the solution can use an code receiver in the line that captures DTMF tones throughout the call. In this case the user could press a series of digits followed by, for example, # (instead of TALK or SEND). The code receiver or media gateway can then send a message to the GS to perform the service. In this case there is no interruption in the voice session. In this case the media gateway can block the transmission of the tones to other parties on the call such that the other parties will not hear them as they are being pressed. This section is in addition to what is described in section "Alternative methods for handling call originations".

19. Corporate Calling Name: Calling name display is based on the carrier network database. This information does not contain calling name information for internal enterprise numbers. The invention enables the redirection of the GR-1188 or IS41 based query in the terminating switch to point to the GS. The GS will access the calling name information from the corporate directory. The GS can also obtain calling name information from a carrier database or other source, and decide which information (or both) to provide to the terminator depending on various factors such as completeness, originator's preferences, etc.

20. IMS Handover/Handoff: The invention enables handoff to occur between a voice conversation on a Wi-Fi network and a cellular network. Signaling between the Wi-Fi network and the cellular network is transited through the GS which converts the messaging between SIP call leg manipulation and ANSI-41 or GSM cellular signaling protocols for invoking a handoff. The solution can support the equivalent of an inter-MSC handoff as is done today in the cellular network, or alternatively a Call Redirection pseudo handoff in which a through-connected call is redirected. The latter uses messages such as SIP JOIN to connect the calls. In the case where the cellular network supports IMS, the GS acts as a SIP AS to perform the application function, and can also act as a peer IMS network including P-CSCF, I-CSCF and S-CSCF. In this case, the GS acting in these functions enables the PBX or IP-PBX that is controlling the user in Wi-Fi mode to be abstracted from having to support IMS to the cellular network, as the PBX/IP-PBX interfaces with the GS which interfaces with the IMS network.

Data—VPN-less session setup for enterprise. The invention enables a GGSN or HA to be including in the GS in the enterprise such that a secure data session can be established automatically between a device on the cellular network and the enterprise network by establishing a GTP tunnel between the carrier-hosted SGSN and the enterprise-hosted GGSN. In addition, in the case where there is a GS-C located in the carrier network that interfaces with GS-Es in the enterprise network, it is possible for the invention to add additional security and encryption specific to the enterprise's needs between the carrier's network and the enterprise. In this configuration, the function of the GGSN can be split between the GS-C and the GS-E such that the carrier network interfaces with the GS-C hosted within the carrier site, while the GTP tunnel and secure encrypted data session can be drawn out to the GS-E hosted within the enterprise. All data traffic to/from the mobile device will traverse the enterprise and its associated secure firewall.

The invention claimed is:

1. A system, comprising:
an enterprise gateway server in an enterprise network, the enterprise gateway server configured to:
convert a request to terminate a session received from a carrier gateway server in a carrier network into a request to originate a session to a terminating subscriber before invoking a terminating service as a destination service specific to the terminating subscriber to enable the enterprise gateway server to invoke originating services, wherein the carrier gateway server is further configured to:
restrict, prior to the session being routed to the terminating subscriber, a termination of the session in response to an invocation of an originating service received from the enterprise gateway server in response to the request to originate the session; and
responsive to the originating services having been performed, route, using the terminating service, the session to a destination service specific to the terminating subscriber in response to a completed execution of the invocation of the originating service.

2. The system of claim 1, wherein the enterprise gateway server is further configured to:
invoke the terminating service.

3. The system of claim 1, wherein an application invokes the terminating service.

4. The system of claim 1, wherein the carrier gateway server is configured to prepare the enterprise gateway server for a communication.

5. The system of claim 1, wherein the enterprise gateway server is configured to enable an application to perform the terminating service once the originating service has been executed.

6. The system of claim 1, wherein the h server is configured to route the session to a destination associated with the terminating subscriber.

7. The system of claim 1, wherein the terminating service is associated with a terminating network application.

8. A method, comprising:
converting, by an enterprise gateway server in an enterprise network, a request to terminate a session received from a carrier gateway server in a carrier network into a request to originate a session to a terminating subscriber before invoking a terminating service as a destination service specific to the terminating subscriber to enable the enterprise gateway server to invoke originating services;
restricting by the carrier gateway server prior to the session being routed to the terminating subscriber a termination of the session in response to an invocation of an originating service received from the enterprise gateway server in response to the request to originate the session; and
responsive to the originating services having been performed, routing, using the terminating service, the session to a destination service specific to the terminating subscriber in response to a completed execution of the invocation of the originating service.

9. The method of claim 8, comprising:
invoking, by the enterprise gateway server, the terminating service.

10. The method of claim 8, comprising:
invoking, by an application, the terminating service.

11. The method of claim 8, comprising:
preparing, by the carrier gateway server, the enterprise gateway server for a communication.

12. The method of claim 8, comprising:
enabling, by the enterprise gateway server, an application to perform the terminating service once the originating service has been executed.

13. The method of claim 8, comprising:
routing, by the carrier gateway server, the session to a destination associated with the terminating subscriber.

14. The method of claim 8, comprising:
associating the terminating service with a terminating network application.

15. A non-transitory computer-readable medium comprising instructions that, when executed by at least one processor, cause the at least one processor to perform:
converting, by an enterprise gateway server in an enterprise network, a request to terminate a session received from a carrier gateway server in a carrier network into a request to originate a session to a terminating subscriber before invoking a terminating service as a destination service specific to the terminating subscriber to enable the enterprise gateway server to invoke originating services;
restricting, by the carrier gateway server prior to the session being routed to the terminating subscriber, a termination of the session in response to an invocation of an originating service received from the enterprise gateway server in response to the request to originate the session; and
responsive to the originating services having been performed, routing, using the terminating service, the session to a destination service specific to the terminating subscriber in response to a completed execution of the invocation of the originating service.

16. The non-transitory computer-readable medium of claim 15, wherein the instructions further cause the at least one processor to perform:
invoking, by the enterprise gateway server, the terminating service.

17. The non-transitory computer-readable medium of claim 15, wherein the instructions further cause the at least one processor to perform:
invoking, by an application, the terminating service.

18. The non-transitory computer-readable medium of claim 15, wherein the instructions further cause the at least one processor to perform:
preparing, by the carrier gateway server, the enterprise gateway server for a communication.

19. The non-transitory computer-readable medium of claim 15, wherein the instructions further cause the at least one processor to perform:
enabling, by the enterprise gateway server, an application to perform the terminating service once the originating service has been executed.

20. The non-transitory computer-readable medium of claim 15, wherein the instructions further cause the at least one processor to perform:
routing, by the carrier gateway server, the session to a destination associated with the terminating subscriber.

* * * * *